US010053597B2

(12) United States Patent
Egan et al.

(10) Patent No.: US 10,053,597 B2
(45) Date of Patent: *Aug. 21, 2018

(54) ACRYLIC DISPERSION-BASED COATING COMPOSITIONS

(71) Applicant: BASF SE, Ludwigshafen (DE)

(72) Inventors: Luke S. Egan, Rock Hill, SC (US); Robert Michael Calhoun, Charlotte, NC (US); Armin Burghart, Charlotte, NC (US); Randall Petrie, Charlotte, NC (US); Randall Brennan, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/761,896

(22) PCT Filed: Jan. 8, 2014

(86) PCT No.: PCT/EP2014/050197
§ 371 (c)(1),
(2) Date: Jul. 17, 2015

(87) PCT Pub. No.: WO2014/111292
PCT Pub. Date: Jul. 24, 2014

(65) Prior Publication Data
US 2015/0361301 A1   Dec. 17, 2015

Related U.S. Application Data

(60) Provisional application No. 61/754,241, filed on Jan. 18, 2013.

(51) Int. Cl.
| | | |
|---|---|---|
| *C09D 179/06* | (2006.01) | |
| *C09D 133/08* | (2006.01) | |
| *C09D 135/06* | (2006.01) | |
| *C08L 33/08* | (2006.01) | |
| *C09D 125/14* | (2006.01) | |
| *C09D 133/26* | (2006.01) | |

(52) U.S. Cl.
CPC ............ *C09D 179/06* (2013.01); *C08L 33/08* (2013.01); *C09D 125/14* (2013.01); *C09D 133/08* (2013.01); *C09D 133/26* (2013.01); *C09D 135/06* (2013.01); *C08L 2205/00* (2013.01)

(58) Field of Classification Search
CPC .. C09D 179/06; C09D 133/08; C09D 133/26; C09D 125/14; C08L 79/06; C08L 33/08; C08L 33/26; C08L 25/14; C08L 2205/02; C08G 2261/60
See application file for complete search history.

(56) References Cited

U.S. PATENT DOCUMENTS

| | | | |
|---|---|---|---|
| 3,549,566 A * | 12/1970 | Mesirov | ............. C09D 133/064 524/26 |
| 4,826,907 A * | 5/1989 | Murao | ................. C09D 133/06 524/394 |
| 5,219,914 A * | 6/1993 | Warburton, Jr. | ........ C09D 5/024 427/333 |
| 5,256,746 A | 10/1993 | Blankenship et al. | |
| 5,258,423 A | 11/1993 | Crabb et al. | |
| 5,260,131 A | 11/1993 | Fukui et al. | |
| 5,260,350 A | 11/1993 | Wright | |
| 5,260,400 A | 11/1993 | Karydas | |
| 5,262,474 A | 11/1993 | Minnis et al. | |
| 5,262,476 A | 11/1993 | Laughner | |
| 5,264,475 A | 11/1993 | Kissel | |
| 5,264,510 A | 11/1993 | Swift et al. | |
| 5,266,646 A | 11/1993 | Eisenhart et al. | |
| 5,268,417 A | 12/1993 | Filges et al. | |
| 5,268,419 A | 12/1993 | Stack et al. | |
| 5,268,437 A | 12/1993 | Holy et al. | |
| 5,270,046 A | 12/1993 | Sakamoto et al. | |
| 5,270,358 A | 12/1993 | Asmus | |
| 5,270,389 A | 12/1993 | Clouet | |
| 5,270,414 A | 12/1993 | Saito et al. | |
| 5,273,706 A | 12/1993 | Laughner | |
| 5,274,006 A | 12/1993 | Kagoshima et al. | |
| 5,276,090 A | 1/1994 | Hallden-Abberton | |
| 5,276,092 A | 1/1994 | Kempner et al. | |
| 5,278,222 A | 1/1994 | Stack | |
| 5,278,225 A | 1/1994 | Kohlhammer et al. | |
| 5,278,271 A | 1/1994 | Miyajima et al. | |

(Continued)

FOREIGN PATENT DOCUMENTS

| | | |
|---|---|---|
| CA | 2079926 | 5/1993 |
| DE | 19822790 | 11/1999 |

(Continued)

OTHER PUBLICATIONS

International Search Report of the European International Searching Authority from International Application No. PCT/EP2014/050197, completed Mar. 18, 2014, 4 pages.

(Continued)

*Primary Examiner* — Nicholas E Hill
(74) *Attorney, Agent, or Firm* — Meunier Carlin & Curfman LLC

(57) ABSTRACT

Coating compositions and methods for their preparation are described. The coating compositions can include a first copolymer produced by emulsion polymerization and derived from one or more monomers including one or more (meth)acrylates, one or more acid monomers, and optionally styrene. The first copolymer can have a Tg from –50° C. to –23° C. and is present in an amount of 10-50% by weight based on the total polymer content. The coating compositions can also include a second copolymer produced by emulsion polymerization and derived from one or more monomers including one or more (meth)acrylates, one or more acid monomers, and optionally styrene. The second copolymer can have a Tg from –15° C. to 25° C. and is present in an amount of 50-90% by weight based on the total polymer content. Further described herein are dried coatings, methods for coating a substrate, and methods for producing a coating.

28 Claims, No Drawings

(56) References Cited

U.S. PATENT DOCUMENTS

| | | |
|---|---|---|
| 5,279,898 A | 1/1994 | Evans et al. |
| 5,280,073 A | 1/1994 | Siol et al. |
| 5,288,807 A | 2/1994 | Hinz |
| 5,288,828 A | 2/1994 | Harris et al. |
| 5,290,855 A | 3/1994 | Kodama et al. |
| 5,294,686 A | 3/1994 | Fiarman et al. |
| 5,294,688 A | 3/1994 | Rehmer et al. |
| 5,296,530 A | 3/1994 | Bors et al. |
| 5,298,554 A | 3/1994 | Rehmer et al. |
| 5,298,585 A | 3/1994 | McCallum et al. |
| 5,300,288 A | 4/1994 | Albright |
| 5,300,570 A | 4/1994 | Ilenda et al. |
| 5,302,592 A | 4/1994 | Osei-Gyimah et al. |
| 5,304,707 A | 4/1994 | Blankenship et al. |
| 5,306,762 A | 4/1994 | Hutter |
| 5,308,894 A | 5/1994 | Laughner |
| 5,310,810 A | 5/1994 | Natoli et al. |
| 5,310,816 A | 5/1994 | Pennington et al. |
| 5,314,943 A | 5/1994 | Steinwand |
| 5,316,860 A | 5/1994 | Stewart et al. |
| 5,318,719 A | 6/1994 | Hughes et al. |
| 5,319,031 A | 6/1994 | Hamilton et al. |
| 5,320,905 A | 6/1994 | Vaughn et al. |
| 5,321,056 A | 6/1994 | Carson et al. |
| 5,322,663 A | 6/1994 | Lai et al. |
| 5,324,456 A | 6/1994 | Degraff |
| 5,326,843 A | 7/1994 | Lorah et al. |
| 5,328,952 A | 7/1994 | Brodnyan et al. |
| 5,328,972 A | 7/1994 | Dada et al. |
| 5,331,018 A | 7/1994 | McGinniss et al. |
| 5,332,782 A | 7/1994 | Liu et al. |
| 5,334,450 A | 8/1994 | Zabrocki et al. |
| 5,336,720 A | 8/1994 | Richards et al. |
| 5,338,490 A | 8/1994 | Dietz et al. |
| 5,338,803 A | 8/1994 | Sun et al. |
| 5,340,858 A | 8/1994 | Bauer et al. |
| 5,340,871 A | 8/1994 | Pearson et al. |
| 5,342,884 A | 8/1994 | Tabor et al. |
| 5,342,899 A | 8/1994 | Graham et al. |
| 5,342,904 A | 8/1994 | Hefner et al. |
| 5,342,910 A | 8/1994 | Kling et al. |
| 5,344,868 A | 9/1994 | Hallden-Abberton et al. |
| 5,346,961 A | 9/1994 | Shaw et al. |
| 5,348,807 A | 9/1994 | Hodder et al. |
| 5,348,992 A | 9/1994 | Pearson et al. |
| 5,348,997 A | 9/1994 | Kato et al. |
| 5,349,025 A | 9/1994 | Siol et al. |
| 5,352,516 A | 10/1994 | Therriault et al. |
| 5,356,616 A | 10/1994 | Sojka et al. |
| 5,360,826 A | 11/1994 | Egolf et al. |
| 5,362,816 A | 11/1994 | Snyder et al. |
| 5,368,761 A | 11/1994 | Gore et al. |
| 5,369,169 A | 11/1994 | La Fleur et al. |
| 5,371,112 A | 12/1994 | Sayre et al. |
| 5,371,179 A | 12/1994 | Paik et al. |
| 5,374,674 A | 12/1994 | Sojka et al. |
| 5,374,684 A | 12/1994 | Tai |
| 5,374,686 A | 12/1994 | Clikeman |
| 5,376,447 A | 12/1994 | Yeung et al. |
| 5,378,758 A | 1/1995 | Amici et al. |
| 5,380,782 A | 1/1995 | Bogan |
| 5,380,801 A | 1/1995 | Fischer et al. |
| 5,384,373 A | 1/1995 | McKinney et al. |
| 5,387,635 A | 2/1995 | Rowland et al. |
| 5,387,641 A | 2/1995 | Yeung et al. |
| 5,389,178 A | 2/1995 | Harvey |
| 5,389,437 A | 2/1995 | Miyajima et al. |
| 5,389,726 A | 2/1995 | Sojka |
| 5,393,795 A | 2/1995 | Hedstrand et al. |
| 5,395,471 A | 3/1995 | Obijeski et al. |
| 5,395,882 A | 3/1995 | Siol et al. |
| 5,395,905 A | 3/1995 | Creamer et al. |
| 5,395,907 A | 3/1995 | Zajaczowski |
| 5,401,695 A | 3/1995 | Wu |
| 5,401,807 A | 3/1995 | Hughes et al. |
| 5,403,875 A | 4/1995 | Bortnik et al. |
| 5,403,894 A | 4/1995 | Tsai et al. |
| 5,403,903 A | 4/1995 | Shimizu et al. |
| 5,405,670 A | 4/1995 | Wetzel et al. |
| 5,408,024 A | 4/1995 | Fischer et al. |
| 5,409,967 A | 4/1995 | Carson et al. |
| 5,413,660 A | 5/1995 | Harvey et al. |
| 5,413,731 A | 5/1995 | Adler et al. |
| 5,414,047 A | 5/1995 | Clikeman |
| 5,416,148 A | 5/1995 | Farah et al. |
| 5,416,160 A | 5/1995 | Johnson |
| 5,419,967 A | 5/1995 | LaFleur et al. |
| 5,420,223 A | 5/1995 | Johnson |
| 5,424,337 A | 6/1995 | Bedel et al. |
| 5,424,362 A | 6/1995 | Hwang et al. |
| 5,426,125 A | 6/1995 | Vo et al. |
| 5,426,156 A | 6/1995 | Bederke et al. |
| 5,430,089 A | 7/1995 | Harris et al. |
| 5,430,101 A | 7/1995 | Minematsu et al. |
| 5,433,984 A | 7/1995 | Ilenda et al. |
| 5,439,739 A | 8/1995 | Furukawa et al. |
| 5,439,998 A | 8/1995 | Lina et al. |
| 5,442,012 A | 8/1995 | Kempner et al. |
| 5,451,644 A | 9/1995 | Fiarman et al. |
| RE35,049 E | 10/1995 | Atherton et al. |
| 5,455,321 A | 10/1995 | Cummings et al. |
| 5,457,156 A | 10/1995 | Liu et al. |
| 5,458,980 A | 10/1995 | Larson |
| 5,460,818 A | 10/1995 | Park et al. |
| 5,461,092 A | 10/1995 | Laughner |
| 5,461,106 A | 10/1995 | Jialanella et al. |
| 5,466,756 A | 11/1995 | Roach et al. |
| 5,468,526 A | 11/1995 | Allen et al. |
| 5,468,800 A | 11/1995 | Foelsch et al. |
| 5,470,622 A | 11/1995 | Rinde et al. |
| 5,470,908 A | 11/1995 | Schmidt et al. |
| 5,470,918 A | 11/1995 | Tsutsumi et al. |
| 5,473,006 A | 12/1995 | Hutter et al. |
| 5,473,031 A | 12/1995 | Tinetti et al. |
| 5,474,855 A | 12/1995 | Antheunisse |
| 5,475,047 A | 12/1995 | Tonson et al. |
| 5,480,720 A | 1/1996 | Eisenhart et al. |
| 5,484,849 A | 1/1996 | Bors et al. |
| 5,486,949 A | 1/1996 | Schrenk et al. |
| 5,491,192 A | 2/1996 | Walker et al. |
| 5,494,508 A | 2/1996 | Vogel |
| 5,494,971 A | 2/1996 | Blankenship |
| 5,494,975 A | 2/1996 | LaVoie et al. |
| 5,498,659 A | 3/1996 | Esser |
| 5,502,089 A | 3/1996 | Bricker et al. |
| 5,502,106 A | 3/1996 | LaFleur et al. |
| 5,503,767 A | 4/1996 | Schwartz |
| 5,504,153 A | 4/1996 | Amici et al. |
| 5,506,282 A | 4/1996 | Min et al. |
| 5,506,307 A | 4/1996 | Memon |
| 5,506,324 A | 4/1996 | Gartner et al. |
| 5,519,063 A | 5/1996 | Mondet et al. |
| 5,519,064 A | 5/1996 | Stringfield et al. |
| 5,520,767 A | 5/1996 | Larson |
| 5,521,253 A | 5/1996 | Lee et al. |
| 5,525,651 A | 6/1996 | Ogoe et al. |
| 5,527,613 A | 6/1996 | Blankenship et al. |
| 5,532,307 A | 7/1996 | Bogan |
| 5,534,310 A | 7/1996 | Rokowski et al. |
| 5,539,054 A | 7/1996 | LaFleur |
| 5,543,448 A | 8/1996 | Laughner |
| 5,545,689 A | 8/1996 | Amici et al. |
| 5,547,756 A | 8/1996 | Kamo et al. |
| 5,548,024 A | 8/1996 | LaVoie et al. |
| 5,559,192 A | 9/1996 | Bors et al. |
| 5,562,953 A | 10/1996 | Bors et al. |
| 5,562,958 A | 10/1996 | Walton et al. |
| 5,562,983 A | 10/1996 | Kono et al. |
| 5,567,353 A | 10/1996 | Bogan |
| 5,567,488 A | 10/1996 | Allen et al. |
| 5,567,489 A | 10/1996 | Allen et al. |
| 5,567,789 A | 10/1996 | Manzouji et al. |
| 5,567,790 A | 10/1996 | Okawa |
| 5,569,687 A | 10/1996 | Sanborn et al. |

(56) References Cited

U.S. PATENT DOCUMENTS

| | | |
|---|---|---|
| 5,569,710 A | 10/1996 | LaFleur et al. |
| 5,573,994 A | 11/1996 | Kabra et al. |
| 5,576,378 A | 11/1996 | Kuhlmann et al. |
| 5,578,247 A | 11/1996 | McGinniss et al. |
| 5,580,650 A | 12/1996 | Forgach et al. |
| 5,599,854 A | 2/1997 | Troy et al. |
| 5,599,890 A | 2/1997 | Tang |
| 5,604,288 A | 2/1997 | Furukawa et al. |
| 5,605,722 A | 2/1997 | Esser |
| 5,605,953 A | 2/1997 | Esser |
| 5,605,960 A | 2/1997 | Brady et al. |
| 5,612,397 A | 3/1997 | Gebhard et al. |
| 5,612,413 A | 3/1997 | Rozkuszka et al. |
| 5,612,820 A | 3/1997 | Schrenk et al. |
| 5,614,582 A | 3/1997 | Hori et al. |
| 5,616,638 A | 4/1997 | Hallden-Abberton et al. |
| 5,618,900 A | 4/1997 | Drumright et al. |
| 5,622,997 A | 4/1997 | Tennison et al. |
| 5,623,004 A | 4/1997 | Bertram et al. |
| 5,625,001 A | 4/1997 | Makower et al. |
| 5,629,377 A | 5/1997 | Burgert et al. |
| 5,633,316 A | 5/1997 | Gartner et al. |
| 5,633,335 A | 5/1997 | Manzouji et al. |
| 5,635,574 A | 6/1997 | Aoyagi et al. |
| 5,643,993 A | 7/1997 | Guerin |
| 5,652,289 A | 7/1997 | Eisenhart et al. |
| 5,652,292 A | 7/1997 | Stanley |
| 5,652,293 A | 7/1997 | Eisenhart et al. |
| 5,652,305 A | 7/1997 | Amici et al. |
| 5,652,306 A | 7/1997 | Meyer et al. |
| 5,654,365 A | 8/1997 | Havriliak et al. |
| 5,654,366 A | 8/1997 | Furukawa et al. |
| 5,658,965 A | 8/1997 | Manzouji et al. |
| 5,663,213 A | 9/1997 | Jones et al. |
| 5,663,241 A | 9/1997 | Takamatsu et al. |
| 5,663,259 A | 9/1997 | Treybig et al. |
| 5,672,379 A | 9/1997 | Schall et al. |
| 5,672,656 A | 9/1997 | Murayama et al. |
| 5,674,934 A | 10/1997 | Schmidt et al. |
| 5,674,943 A | 10/1997 | Farah et al. |
| 5,679,732 A | 10/1997 | Van Rheenen |
| 5,681,880 A | 10/1997 | Desor et al. |
| 5,686,528 A | 11/1997 | Willis et al. |
| 5,693,704 A | 12/1997 | Estes |
| 5,693,716 A | 12/1997 | Bott et al. |
| 5,700,867 A | 12/1997 | Ishiyama et al. |
| 5,700,873 A | 12/1997 | Zajaczkowski et al. |
| 5,700,885 A | 12/1997 | Pham et al. |
| 5,703,157 A | 12/1997 | Fujiwara et al. |
| 5,705,560 A | 1/1998 | Takarabe et al. |
| 5,710,227 A | 1/1998 | Freeman et al. |
| 5,712,031 A | 1/1998 | Kelch et al. |
| 5,714,537 A | 2/1998 | Laughner et al. |
| 5,717,000 A | 2/1998 | Karande et al. |
| 5,723,182 A | 3/1998 | Choi et al. |
| 5,731,377 A | 3/1998 | Friel |
| 5,731,379 A | 3/1998 | Kennan et al. |
| 5,741,594 A | 4/1998 | Jialanella |
| 5,744,564 A | 4/1998 | Stanley et al. |
| 5,750,587 A | 5/1998 | Manzouji et al. |
| 5,753,766 A | 5/1998 | Bott et al. |
| 5,755,972 A | 5/1998 | Hann et al. |
| 5,756,659 A | 5/1998 | Hughes et al. |
| 5,763,012 A | 6/1998 | Zhao et al. |
| 5,766,908 A | 6/1998 | Klein et al. |
| 5,767,213 A | 6/1998 | Graham et al. |
| 5,777,034 A | 7/1998 | Shah et al. |
| 5,783,626 A | 7/1998 | Taylor et al. |
| 5,786,424 A | 7/1998 | Hofmeister et al. |
| 5,804,254 A | 9/1998 | Nedwick et al. |
| 5,804,632 A | 9/1998 | Haddleton et al. |
| 5,817,712 A | 10/1998 | Weinberger et al. |
| 5,820,993 A | 10/1998 | Schall et al. |
| 5,821,283 A | 10/1998 | Hesler et al. |
| 5,821,295 A | 10/1998 | Nakayama et al. |
| 5,824,762 A | 10/1998 | Saruyama et al. |
| 5,837,762 A | 11/1998 | Stollmaier et al. |
| 5,837,766 A | 11/1998 | Metro et al. |
| 5,840,428 A | 11/1998 | Blizzard et al. |
| 5,846,657 A | 12/1998 | Wu |
| 5,856,409 A | 1/1999 | Ziemelis et al. |
| 5,856,611 A | 1/1999 | Schlaefer et al. |
| 5,859,112 A | 1/1999 | Overbeek et al. |
| 5,863,999 A | 1/1999 | Kinker et al. |
| 5,866,664 A | 2/1999 | McCallum et al. |
| 5,869,590 A | 2/1999 | Clark et al. |
| 5,869,591 A | 2/1999 | McKay et al. |
| 5,879,759 A | 3/1999 | Zang |
| 5,883,188 A | 3/1999 | Hwang et al. |
| 5,885,746 A | 3/1999 | Iwai et al. |
| 5,891,950 A | 4/1999 | Collins et al. |
| 5,900,462 A | 5/1999 | Tanaka |
| 5,910,358 A | 6/1999 | Thoen et al. |
| 5,910,532 A | 6/1999 | Schmidt et al. |
| 5,912,293 A | 6/1999 | Stockwell et al. |
| 5,916,960 A | 6/1999 | Lum et al. |
| 5,916,967 A | 6/1999 | Jones et al. |
| 5,919,849 A | 7/1999 | Memon et al. |
| 5,922,410 A | 7/1999 | Swartz et al. |
| 5,922,789 A | 7/1999 | Kohlhammer et al. |
| 5,928,206 A | 7/1999 | Miyake et al. |
| 5,928,730 A | 7/1999 | Nakayama |
| 5,929,128 A | 7/1999 | Whetten et al. |
| 5,929,172 A | 7/1999 | Zajaczkowski |
| 5,932,350 A | 8/1999 | Lauer et al. |
| 5,948,874 A | 9/1999 | Pike et al. |
| 5,959,016 A | 9/1999 | Schmidt et al. |
| 5,962,545 A | 10/1999 | Chaudhary et al. |
| 5,962,556 A | 10/1999 | Taylor |
| 5,962,571 A | 10/1999 | Overbeek et al. |
| 5,962,609 A | 10/1999 | Haddleton et al. |
| 5,969,046 A | 10/1999 | Schindler et al. |
| 5,969,063 A | 10/1999 | Parker et al. |
| 5,972,363 A | 10/1999 | Clikeman et al. |
| 5,977,194 A | 11/1999 | Mork et al. |
| 5,977,271 A | 11/1999 | McKay et al. |
| 5,977,274 A | 11/1999 | Leblanc et al. |
| 5,981,642 A | 11/1999 | Overbeek et al. |
| 5,981,666 A | 11/1999 | Zajaczkowski et al. |
| 5,986,003 A | 11/1999 | Lee et al. |
| 5,988,455 A | 11/1999 | Pearson et al. |
| 5,997,952 A | 12/1999 | Harris et al. |
| 5,997,969 A | 12/1999 | Gardon |
| 5,998,514 A | 12/1999 | Cheng et al. |
| 5,998,543 A | 12/1999 | Collins et al. |
| 6,005,042 A | 12/1999 | Desor et al. |
| 6,010,783 A | 1/2000 | Tung |
| 6,013,732 A | 1/2000 | Yamana et al. |
| 6,017,721 A | 1/2000 | Butz |
| 6,017,848 A | 1/2000 | Mando et al. |
| 6,025,404 A | 2/2000 | Harris et al. |
| 6,031,047 A | 2/2000 | Brady et al. |
| 6,040,386 A | 3/2000 | Iliopoulo et al. |
| 6,040,409 A | 3/2000 | Lau et al. |
| 6,051,633 A | 4/2000 | Tomko et al. |
| 6,057,400 A | 5/2000 | Kinney et al. |
| 6,060,556 A | 5/2000 | Collins et al. |
| 6,063,823 A | 5/2000 | Nakatani et al. |
| 6,072,013 A | 6/2000 | Manzouji et al. |
| 6,077,527 A | 6/2000 | Tan et al. |
| 6,084,029 A | 7/2000 | McGee |
| 6,084,044 A | 7/2000 | Roe et al. |
| 6,087,425 A | 7/2000 | Eisenhart et al. |
| 6,087,447 A | 7/2000 | Stevens et al. |
| 6,090,875 A | 7/2000 | Staples et al. |
| 6,090,882 A | 7/2000 | Trumbo et al. |
| 6,090,902 A | 7/2000 | Kuo et al. |
| 6,096,669 A | 8/2000 | Colegrove et al. |
| 6,113,978 A | 9/2000 | Ornstein et al. |
| 6,120,638 A | 9/2000 | Baxter et al. |
| 6,124,370 A | 9/2000 | Walton et al. |
| 6,136,883 A | 10/2000 | Yang et al. |
| 6,136,896 A | 10/2000 | Lee et al. |
| 6,140,431 A | 10/2000 | Kinker et al. |

(56) References Cited

U.S. PATENT DOCUMENTS

| | | |
|---|---|---|
| 6,143,829 A | 11/2000 | Babb et al. |
| 6,153,690 A | 11/2000 | Larson et al. |
| 6,160,029 A | 12/2000 | Chaudhary et al. |
| 6,160,044 A | 12/2000 | Jimbo et al. |
| 6,160,057 A | 12/2000 | Webster et al. |
| 6,168,866 B1 | 1/2001 | Clark |
| 6,183,829 B1 | 2/2001 | Daecher et al. |
| 6,184,294 B1 | 2/2001 | Park et al. |
| 6,187,834 B1 | 2/2001 | Thayer et al. |
| 6,191,244 B1 | 2/2001 | Lau et al. |
| 6,194,525 B1 | 2/2001 | Ortiz et al. |
| 6,197,382 B1 | 3/2001 | Ornstein et al. |
| 6,201,067 B1 | 3/2001 | Cheung et al. |
| 6,207,780 B1 | 3/2001 | Stockhausen et al. |
| 6,218,464 B1 | 4/2001 | Parker et al. |
| 6,218,491 B1 | 4/2001 | Fu et al. |
| 6,221,448 B1 | 4/2001 | Baetzold et al. |
| 6,225,242 B1 | 5/2001 | Lau et al. |
| 6,228,201 B1 | 5/2001 | Cooper et al. |
| 6,228,901 B1 | 5/2001 | Brown et al. |
| 6,228,913 B1 | 5/2001 | Owens et al. |
| 6,228,949 B1 | 5/2001 | Webster et al. |
| 6,232,417 B1 | 5/2001 | Rhodes et al. |
| 6,235,814 B1 | 5/2001 | Bowe |
| 6,238,795 B1 | 5/2001 | Strom et al. |
| 6,239,209 B1 | 5/2001 | Yang et al. |
| 6,239,228 B1 | 5/2001 | Zajaczkowski et al. |
| 6,242,515 B1 | 6/2001 | Zhao et al. |
| 6,242,526 B1 | 6/2001 | Siddiqui et al. |
| 6,242,528 B1 | 6/2001 | Clark et al. |
| 6,245,711 B1 | 6/2001 | Halbrook |
| 6,248,826 B1 | 6/2001 | Solomon et al. |
| 6,251,213 B1 | 6/2001 | Bartman et al. |
| 6,251,485 B1 | 6/2001 | Harris et al. |
| 6,251,680 B1 | 6/2001 | Fu et al. |
| 6,251,973 B1 | 6/2001 | Robinson et al. |
| 6,251,988 B1 | 6/2001 | Blum et al. |
| 6,254,956 B1 | 7/2001 | Kjellqvist et al. |
| 6,255,381 B1 | 7/2001 | Park et al. |
| 6,260,715 B1 | 7/2001 | Simard et al. |
| 6,262,149 B1 | 7/2001 | Clark et al. |
| 6,262,161 B1 | 7/2001 | Betso et al. |
| 6,262,169 B1 | 7/2001 | Helmer et al. |
| 6,265,514 B1 | 7/2001 | Warren et al. |
| 6,277,437 B1 | 8/2001 | Helmer et al. |
| 6,280,808 B1 | 8/2001 | Fields et al. |
| 6,291,021 B1 | 9/2001 | Morita et al. |
| 6,297,328 B1 | 10/2001 | Collins et al. |
| 6,300,407 B1 | 10/2001 | Machleder et al. |
| 6,300,409 B2 | 10/2001 | Lau et al. |
| 6,303,186 B1 | 10/2001 | Bors et al. |
| 6,303,188 B1 | 10/2001 | Bors et al. |
| 6,306,962 B1 | 10/2001 | Pham et al. |
| 6,306,969 B1 | 10/2001 | Patel et al. |
| 6,306,991 B1 | 10/2001 | Fischer et al. |
| 6,310,112 B1 | 10/2001 | Vo et al. |
| 6,310,125 B1 | 10/2001 | Rayner |
| 6,310,159 B1 | 10/2001 | Eiffler et al. |
| 6,322,860 B1 | 11/2001 | Stein et al. |
| 6,325,939 B2 | 12/2001 | Strom et al. |
| 6,326,449 B1 | 12/2001 | Haldankar |
| 6,331,580 B1 | 12/2001 | Molnar |
| 6,333,378 B1 | 12/2001 | Clark et al. |
| 6,335,404 B1 | 1/2002 | Kirk et al. |
| 6,337,366 B1 | 1/2002 | Amick et al. |
| 6,338,801 B2 | 1/2002 | Strom et al. |
| 6,344,502 B1 | 2/2002 | Babjak et al. |
| 6,346,300 B1 | 2/2002 | Ruepping |
| 6,348,623 B2 | 2/2002 | Webster et al. |
| 6,358,620 B1 | 3/2002 | Yokelson et al. |
| 6,359,110 B1 | 3/2002 | Mussell et al. |
| 6,361,768 B1 | 3/2002 | Galleguillos et al. |
| 6,362,274 B1 | 3/2002 | Legrand et al. |
| 6,368,575 B2 | 4/2002 | Chang et al. |
| 6,369,182 B1 | 4/2002 | Whipple et al. |
| 6,372,831 B1 | 4/2002 | Sikkema et al. |
| 6,372,871 B1 | 4/2002 | Jimbo et al. |
| 6,376,574 B1 | 4/2002 | Helmer et al. |
| 6,376,600 B1 | 4/2002 | Solomon et al. |
| 6,380,303 B1 | 4/2002 | Ogoe et al. |
| 6,380,304 B1 | 4/2002 | Vanspeybroeck et al. |
| 6,383,569 B2 | 5/2002 | Ornstein et al. |
| 6,384,104 B1 | 5/2002 | Chang et al. |
| 6,384,131 B1 | 5/2002 | Kinney et al. |
| 6,387,167 B1 | 5/2002 | Haldankar |
| 6,395,813 B1 | 5/2002 | Duccini et al. |
| 6,395,836 B1 | 5/2002 | Shinoda |
| 6,399,171 B1 | 6/2002 | Merlin et al. |
| 6,417,267 B1 | 7/2002 | Stockl et al. |
| 6,419,830 B2 | 7/2002 | Strom et al. |
| 6,423,382 B1 | 7/2002 | Bowe et al. |
| 6,423,416 B1 | 7/2002 | Nanavati |
| 6,423,805 B1 | 7/2002 | Bacho et al. |
| 6,433,058 B1 | 8/2002 | Weir et al. |
| 6,433,098 B1 | 8/2002 | Brown et al. |
| 6,436,421 B1 | 8/2002 | Schindler et al. |
| 6,436,498 B1 | 8/2002 | Rangwalla et al. |
| 6,441,082 B1 | 8/2002 | Weitzel et al. |
| 6,444,749 B2 | 9/2002 | Mestach |
| 6,447,845 B1 | 9/2002 | Nanavati et al. |
| 6,451,403 B1 | 9/2002 | Daecher et al. |
| 6,451,899 B1 | 9/2002 | Zhao et al. |
| 6,451,912 B1 | 9/2002 | Kelch |
| 6,451,951 B2 | 9/2002 | Beckley et al. |
| 6,455,161 B1 | 9/2002 | Regnier et al. |
| 6,458,458 B1 | 10/2002 | Cooke et al. |
| 6,458,878 B1 | 10/2002 | Tsuboi et al. |
| 6,465,558 B2 | 10/2002 | Scheibelhoffer et al. |
| 6,465,563 B2 | 10/2002 | Mori et al. |
| 6,471,885 B2 | 10/2002 | Chiang et al. |
| 6,472,452 B2 | 10/2002 | Ruepping |
| 6,475,556 B1 | 11/2002 | Sobczak et al. |
| 6,476,168 B1 | 11/2002 | Dahanayake et al. |
| 6,479,571 B1 | 11/2002 | Cooke et al. |
| 6,482,502 B1 | 11/2002 | Fields et al. |
| 6,482,886 B1 | 11/2002 | Finlayson et al. |
| 6,489,381 B1 | 12/2002 | Dreher et al. |
| 6,489,385 B1 | 12/2002 | Fujii et al. |
| 6,492,445 B2 | 12/2002 | Siddiqui et al. |
| 6,492,450 B1 | 12/2002 | Hsu |
| 6,503,992 B2 | 1/2003 | Mitchell et al. |
| 6,514,584 B1 | 2/2003 | Merlin et al. |
| 6,515,041 B2 | 2/2003 | Hayashi et al. |
| 6,515,042 B2 | 2/2003 | Kriessmann et al. |
| 6,515,082 B1 | 2/2003 | Brown et al. |
| 6,518,348 B1 | 2/2003 | Lee et al. |
| 6,521,696 B2 | 2/2003 | Oates et al. |
| 6,525,161 B1 | 2/2003 | Hall |
| 6,528,581 B1 | 3/2003 | Kelly et al. |
| 6,528,593 B1 | 3/2003 | Eiffler et al. |
| 6,534,592 B1 | 3/2003 | Chou et al. |
| 6,538,062 B2 | 3/2003 | Sakaguchi et al. |
| 6,541,088 B1 | 4/2003 | Rangwalla et al. |
| 6,541,571 B1 | 4/2003 | Haldankar |
| 6,548,596 B1 | 4/2003 | Kohr et al. |
| 6,552,129 B2 | 4/2003 | Babb et al. |
| 6,555,641 B2 | 4/2003 | Parker et al. |
| 6,558,688 B2 | 5/2003 | Saishin et al. |
| 6,558,809 B1 | 5/2003 | Kelch et al. |
| 6,559,193 B2 | 5/2003 | Nonoyama et al. |
| 6,559,231 B2 | 5/2003 | Hasegawa et al. |
| 6,566,466 B2 | 5/2003 | Zajaczkowski |
| 6,566,469 B1 | 5/2003 | Kaplan et al. |
| 6,569,976 B2 | 5/2003 | Baxter et al. |
| 6,572,965 B1 | 6/2003 | McGee et al. |
| 6,579,958 B2 | 6/2003 | Wilson |
| 6,586,097 B1 | 7/2003 | Pascault et al. |
| 6,586,501 B1 | 7/2003 | Dalton et al. |
| 6,586,512 B1 | 7/2003 | Dukes et al. |
| 6,590,006 B2 | 7/2003 | Park et al. |
| 6,593,399 B1 | 7/2003 | La Fleur et al. |
| 6,602,557 B2 | 8/2003 | Ruepping |
| 6,605,359 B2 | 8/2003 | Robinson et al. |
| 6,610,282 B1 | 8/2003 | Ghosh |

(56) References Cited

U.S. PATENT DOCUMENTS

| | | |
|---|---|---|
| 6,613,827 B2 | 9/2003 | Lundgard et al. |
| 6,617,267 B2 | 9/2003 | Soane et al. |
| 6,620,474 B1 | 9/2003 | Regnier et al. |
| 6,624,212 B2 | 9/2003 | Weier et al. |
| 6,627,670 B2 | 9/2003 | Mork et al. |
| 6,627,679 B1 | 9/2003 | Kling |
| 6,630,533 B2 | 10/2003 | Konopka et al. |
| 6,632,861 B1 | 10/2003 | Weitzel et al. |
| 6,632,879 B2 | 10/2003 | Brann et al. |
| 6,632,906 B1 | 10/2003 | Kamiyama |
| 6,639,012 B2 | 10/2003 | Wills et al. |
| 6,642,335 B2 | 11/2003 | Kawase et al. |
| 6,646,058 B1 | 11/2003 | Koger |
| 6,646,082 B2 | 11/2003 | Ghosh et al. |
| 6,646,086 B2 | 11/2003 | Slone |
| 6,646,091 B2 | 11/2003 | Taylor et al. |
| 6,656,979 B1 | 12/2003 | Kitano et al. |
| 6,657,011 B2 | 12/2003 | Lau et al. |
| 6,657,014 B1 | 12/2003 | Mori et al. |
| 6,660,394 B1 | 12/2003 | Ishizuki et al. |
| 6,663,974 B2 | 12/2003 | Kelch et al. |
| 6,664,327 B2 | 12/2003 | Daisey et al. |
| 6,669,953 B1 | 12/2003 | Kamiyama |
| 6,670,419 B2 | 12/2003 | Lau et al. |
| 6,683,120 B2 | 1/2004 | Munro et al. |
| 6,683,132 B1 | 1/2004 | Schick et al. |
| 6,686,008 B1 | 2/2004 | Merlin et al. |
| 6,686,321 B2 | 2/2004 | Boden et al. |
| 6,689,200 B2 | 2/2004 | Scarborough et al. |
| 6,691,715 B2 | 2/2004 | Matz et al. |
| 6,693,151 B2 | 2/2004 | Throne et al. |
| 6,703,433 B1 | 3/2004 | Bahadur et al. |
| 6,706,216 B1 | 3/2004 | Malz et al. |
| 6,706,217 B2 | 3/2004 | Malz et al. |
| 6,706,779 B2 | 3/2004 | Bahadur et al. |
| 6,706,818 B2 | 3/2004 | Ishihara et al. |
| 6,710,128 B1 | 3/2004 | Helmer et al. |
| 6,716,912 B2 | 4/2004 | Freeman et al. |
| 6,716,929 B2 | 4/2004 | Wilson |
| 6,723,486 B2 | 4/2004 | Goodall et al. |
| 6,723,764 B2 | 4/2004 | Sakabe |
| 6,723,775 B2 | 4/2004 | Lau et al. |
| 6,727,314 B2 | 4/2004 | Burghart et al. |
| 6,730,718 B1 | 5/2004 | Jakob |
| 6,730,734 B1 | 5/2004 | Hamilton et al. |
| 6,730,740 B1 | 5/2004 | Mestach et al. |
| 6,740,358 B2 | 5/2004 | Speece et al. |
| 6,743,844 B1 | 6/2004 | Tabor et al. |
| 6,753,355 B2 | 6/2004 | Stollmaier et al. |
| 6,756,075 B2 | 6/2004 | DeMasi et al. |
| 6,756,459 B2 | 6/2004 | Larson et al. |
| 6,759,463 B2 | 7/2004 | Lorah et al. |
| 6,759,484 B1 | 7/2004 | Murayama et al. |
| 6,762,241 B1 | 7/2004 | Blum et al. |
| 6,765,049 B2 | 7/2004 | Lorah et al. |
| 6,767,931 B2 | 7/2004 | Martinez et al. |
| 6,770,285 B2 | 8/2004 | Keenan et al. |
| 6,784,239 B2 | 8/2004 | Wada et al. |
| 6,794,042 B1 | 9/2004 | Merlin et al. |
| 6,803,390 B2 | 10/2004 | Lekovic et al. |
| 6,812,309 B2 | 11/2004 | Clark |
| 6,812,366 B2 | 11/2004 | Lin |
| 6,815,475 B2 | 11/2004 | Donald et al. |
| 6,818,684 B2 | 11/2004 | Slone |
| 6,844,065 B2 | 1/2005 | Reddy et al. |
| 6,846,564 B1 | 1/2005 | Pascault et al. |
| 6,848,777 B2 | 2/2005 | Chen et al. |
| 6,849,681 B2 | 2/2005 | Hutter et al. |
| 6,852,819 B2 | 2/2005 | Ohnishi et al. |
| 6,858,299 B2 | 2/2005 | Lundquist et al. |
| 6,861,475 B2 | 3/2005 | Ilenda et al. |
| 6,864,309 B2 | 3/2005 | Lau et al. |
| 6,869,996 B1 | 3/2005 | Krajnik et al. |
| 6,870,011 B2 | 3/2005 | MacQueen et al. |
| 6,875,797 B2 | 4/2005 | Redlich et al. |
| 6,875,820 B2 | 4/2005 | Berard et al. |
| 6,878,776 B1 | 4/2005 | Pascault et al. |
| 6,884,468 B1 | 4/2005 | Abundis et al. |
| 6,884,843 B2 | 4/2005 | Kauffman et al. |
| 6,887,574 B2 | 5/2005 | Dean et al. |
| 6,887,960 B2 | 5/2005 | Parker et al. |
| 6,893,722 B2 | 5/2005 | McGee |
| 6,900,249 B2 | 5/2005 | Mork et al. |
| 6,914,091 B2 | 7/2005 | Donald et al. |
| 6,914,095 B2 | 7/2005 | Lorah et al. |
| 6,914,099 B2 | 7/2005 | Kim |
| 6,919,400 B2 | 7/2005 | Nungesser et al. |
| 6,924,011 B2 | 8/2005 | Aert et al. |
| 6,931,809 B1 | 8/2005 | Brown et al. |
| 6,939,922 B2 | 9/2005 | Beckley et al. |
| 6,943,231 B2 | 9/2005 | Bühler |
| 6,951,598 B2 | 10/2005 | Flugge et al. |
| 6,953,501 B2 | 10/2005 | Herbert et al. |
| 6,967,227 B1 | 11/2005 | Hutter |
| 6,969,756 B2 | 11/2005 | Brennan et al. |
| 6,982,288 B1 | 1/2006 | Mitra et al. |
| 6,987,151 B2 | 1/2006 | Gartner et al. |
| 6,989,191 B2 | 1/2006 | Weissgerber et al. |
| 6,992,121 B1 | 1/2006 | Peters et al. |
| 6,998,435 B1 | 2/2006 | Hungrige et al. |
| 7,025,825 B2 | 4/2006 | Pyzik et al. |
| 7,025,853 B2 | 4/2006 | Kesselmayer |
| 7,071,256 B2 | 7/2006 | Green |
| 7,071,260 B1 | 7/2006 | Kuropka |
| 7,073,671 B2 | 7/2006 | Charkoudian |
| 7,077,981 B2 | 7/2006 | Wehner et al. |
| 7,101,924 B2 | 9/2006 | Von Schmittou et al. |
| 7,112,616 B2 | 9/2006 | Takizawa et al. |
| 7,115,682 B2 | 10/2006 | Guo et al. |
| 7,132,468 B2 | 11/2006 | Tepe |
| 7,132,489 B2 | 11/2006 | Lee et al. |
| 7,138,139 B2 | 11/2006 | Gauthier et al. |
| 7,150,787 B2 | 12/2006 | Clamen et al. |
| 7,159,655 B2 | 1/2007 | Ke et al. |
| 7,160,957 B2 | 1/2007 | Kuriyama et al. |
| 7,173,074 B2 | 2/2007 | Mitra et al. |
| 7,186,769 B2 | 3/2007 | Von Schmittou et al. |
| 7,186,773 B2 | 3/2007 | Araki et al. |
| 7,199,180 B1 | 4/2007 | Simmons et al. |
| 7,208,544 B2 | 4/2007 | Kawase et al. |
| 7,211,613 B2 | 5/2007 | Lorah et al. |
| 7,214,728 B2 | 5/2007 | Kimpimaki et al. |
| 7,214,737 B2 | 5/2007 | Albalat Perez et al. |
| 7,217,443 B2 | 5/2007 | Bobsein et al. |
| 7,220,338 B2 | 5/2007 | Chen et al. |
| 7,220,802 B2 | 5/2007 | Julien et al. |
| 7,226,887 B2 | 6/2007 | Wehmeyer |
| 7,226,955 B2 | 6/2007 | Subramonian et al. |
| 7,232,862 B2 | 6/2007 | Odagawa et al. |
| 7,238,732 B2 | 7/2007 | Bamborough et al. |
| 7,238,742 B2 | 7/2007 | Weese et al. |
| 7,244,784 B2 | 7/2007 | Amick et al. |
| 7,247,694 B2 | 7/2007 | Stein et al. |
| 7,253,307 B1 | 8/2007 | Carlson et al. |
| 7,256,227 B2 | 8/2007 | Stone |
| 7,259,203 B2 | 8/2007 | Chou et al. |
| 7,262,242 B2 | 8/2007 | Gielens et al. |
| 7,270,180 B2 | 9/2007 | Ke et al. |
| 7,271,202 B2 | 9/2007 | Krabbenborg et al. |
| 7,273,842 B1 | 9/2007 | VanDyk et al. |
| 7,285,585 B2 | 10/2007 | Coyle et al. |
| 7,285,590 B2 | 10/2007 | Holub et al. |
| 7,309,729 B1 | 12/2007 | Weese et al. |
| 7,312,277 B2 | 12/2007 | Maes et al. |
| 7,312,292 B2 | 12/2007 | Ravikiran et al. |
| 7,323,078 B2 | 1/2008 | Berezuk et al. |
| 7,323,527 B1 | 1/2008 | Bohling et al. |
| 7,329,722 B2 | 2/2008 | Vaitkeviciene et al. |
| 7,332,540 B2 | 2/2008 | Theelen et al. |
| 7,344,811 B2 | 3/2008 | Michaleviciute et al. |
| 7,347,988 B2 | 3/2008 | Hu et al. |
| 7,361,710 B2 | 4/2008 | Thames et al. |
| 7,364,774 B2 | 4/2008 | Urscheler et al. |
| 7,375,096 B1 | 5/2008 | Davis et al. |

(56) References Cited

U.S. PATENT DOCUMENTS

| | | | |
|---|---|---|---|
| 7,393,887 | B2 | 7/2008 | Friedrich et al. |
| 7,396,561 | B2 | 7/2008 | Rühe |
| 7,396,871 | B2 | 7/2008 | Shoaf et al. |
| 7,399,810 | B2 | 7/2008 | Creamer et al. |
| 7,399,818 | B2 | 7/2008 | Bromm et al. |
| 7,405,169 | B2 | 7/2008 | Lu |
| 7,411,008 | B2 | 8/2008 | Tucker et al. |
| 7,414,091 | B2 | 8/2008 | Chen et al. |
| 7,417,086 | B2 | 8/2008 | Griffith et al. |
| 7,425,246 | B2 | 9/2008 | Urscheler |
| 7,445,849 | B2 | 11/2008 | Apitz et al. |
| 7,452,935 | B2 | 11/2008 | Slone et al. |
| 7,452,952 | B2 | 11/2008 | Kohr et al. |
| 7,455,892 | B2 | 11/2008 | Goodwin et al. |
| 7,459,496 | B2 | 12/2008 | Hsu et al. |
| 7,470,751 | B2 | 12/2008 | Taylor et al. |
| 7,479,521 | B2 | 1/2009 | Braun et al. |
| 7,504,466 | B2 | 3/2009 | Devonport et al. |
| 7,507,436 | B2 | 3/2009 | Nakano et al. |
| 7,510,623 | B2 | 3/2009 | Lutz et al. |
| 7,517,591 | B2 | 4/2009 | Miyoshi et al. |
| 7,520,559 | B2 | 4/2009 | Vo et al. |
| 7,521,099 | B2 | 4/2009 | Ochi et al. |
| 7,521,100 | B2 | 4/2009 | Imaizumi et al. |
| 7,521,101 | B2 | 4/2009 | Naisby et al. |
| 7,531,600 | B1 | 5/2009 | Rey |
| 7,534,843 | B2 | 5/2009 | Jialanella et al. |
| 7,537,802 | B2 | 5/2009 | Rosano |
| 7,538,151 | B2 | 5/2009 | Fernandes et al. |
| 7,538,153 | B2 | 5/2009 | Bacher et al. |
| 7,544,401 | B2 | 6/2009 | Dungworth et al. |
| 7,547,745 | B2 | 6/2009 | Valette |
| 7,557,158 | B2 | 7/2009 | VanRheenen |
| 7,557,235 | B2 | 7/2009 | Lai et al. |
| 7,557,372 | B2 | 7/2009 | Yang et al. |
| 7,563,836 | B2 | 7/2009 | Pierni et al. |
| 7,572,840 | B2 | 8/2009 | Kleijn et al. |
| 7,572,843 | B2 | 8/2009 | Renz et al. |
| 7,576,157 | B2 | 8/2009 | Pajerski |
| 7,579,081 | B2 | 8/2009 | Brown |
| 7,585,915 | B2 | 9/2009 | Jakob et al. |
| 7,592,412 | B2 | 9/2009 | Cray et al. |
| 7,608,655 | B2 | 10/2009 | Hunig et al. |
| 7,612,145 | B2 | 11/2009 | Azimipour et al. |
| 7,618,693 | B2 | 11/2009 | Dungworth et al. |
| 7,625,687 | B2 | 12/2009 | Hu et al. |
| 7,629,414 | B2 | 12/2009 | Bardman et al. |
| 7,637,961 | B2 | 12/2009 | El A'mma et al. |
| 7,638,176 | B2 | 12/2009 | Kasperchik et al. |
| 7,638,579 | B2 | 12/2009 | Finch et al. |
| 7,648,034 | B2 | 1/2010 | Charkoudian et al. |
| 7,648,767 | B2 | 1/2010 | Fu et al. |
| 7,678,156 | B2 | 3/2010 | Gross et al. |
| 7,678,433 | B2 | 3/2010 | Ochi et al. |
| 7,683,110 | B2 | 3/2010 | Schlesiger et al. |
| 7,683,131 | B2 | 3/2010 | Goldacker et al. |
| 7,687,561 | B1 | 3/2010 | Misiak |
| 7,691,942 | B2 | 4/2010 | Bardman et al. |
| 7,700,703 | B2 | 4/2010 | Hughes et al. |
| 7,709,555 | B2 | 5/2010 | Stappers et al. |
| 7,718,731 | B2 | 5/2010 | Cogordan et al. |
| 7,723,850 | B2 | 5/2010 | Gallagher et al. |
| 7,732,506 | B2 | 6/2010 | Wang et al. |
| 7,732,525 | B2 | 6/2010 | Branston et al. |
| 7,741,401 | B2 | 6/2010 | Harris et al. |
| 7,741,402 | B2 | 6/2010 | Bobsein et al. |
| 7,745,546 | B2 | 6/2010 | MacQueen et al. |
| 7,754,300 | B2 | 7/2010 | Beyer et al. |
| 7,759,404 | B2 | 7/2010 | Burgun et al. |
| 7,767,747 | B2 | 8/2010 | Lind et al. |
| 7,767,770 | B2 | 8/2010 | Han et al. |
| 7,780,744 | B2 | 8/2010 | Shah et al. |
| 7,790,244 | B2 | 9/2010 | Dungworth et al. |
| 7,794,565 | B2 | 9/2010 | Shannon et al. |
| 7,803,864 | B2 | 9/2010 | Bobsein et al. |
| 7,807,271 | B2 | 10/2010 | Branston et al. |
| 7,807,739 | B2 | 10/2010 | Obst et al. |
| 7,807,765 | B2 | 10/2010 | Ghosh et al. |
| 7,820,754 | B2 | 10/2010 | Betremieux et al. |
| 7,824,746 | B2 | 11/2010 | Imaizumi et al. |
| 7,829,611 | B2 | 11/2010 | Kelly |
| 7,829,631 | B2 | 11/2010 | Wu et al. |
| 7,834,087 | B2 | 11/2010 | Joffre et al. |
| 7,842,755 | B2 | 11/2010 | Morita et al. |
| 7,847,016 | B2 | 12/2010 | Turek et al. |
| 7,851,575 | B2 | 12/2010 | Ravikiran et al. |
| 7,858,197 | B2 | 12/2010 | Ahn et al. |
| 7,875,355 | B2 | 1/2011 | Rouge et al. |
| 7,893,157 | B2 | 2/2011 | Troy et al. |
| 7,893,162 | B2 | 2/2011 | Lafleur et al. |
| 7,897,689 | B2 | 3/2011 | Harris et al. |
| 7,906,591 | B2 | 3/2011 | Weinstein et al. |
| 7,910,663 | B2 | 3/2011 | Taylor et al. |
| 7,910,680 | B2 | 3/2011 | White et al. |
| 7,914,645 | B2 | 3/2011 | Schalau et al. |
| 7,923,503 | B2 | 4/2011 | Takahashi et al. |
| 7,931,963 | B2 | 4/2011 | Maurer et al. |
| 7,939,169 | B2 | 5/2011 | McGee et al. |
| 7,947,760 | B2 | 5/2011 | Janmaat et al. |
| 7,947,776 | B2 | 5/2011 | Moncla et al. |
| 7,947,790 | B2 | 5/2011 | Katsurao et al. |
| 7,951,429 | B2 | 5/2011 | Miller |
| 7,951,884 | B1 | 5/2011 | Birkett et al. |
| 7,955,696 | B2 | 6/2011 | Baikerikar et al. |
| 7,955,702 | B2 | 6/2011 | Schwoeppe et al. |
| 7,956,132 | B2 | 6/2011 | Arriola et al. |
| 7,968,619 | B2 | 6/2011 | Cottrell et al. |
| 7,968,641 | B2 | 6/2011 | Killilea |
| 7,968,650 | B2 | 6/2011 | Tighe et al. |
| 7,981,327 | B2 | 7/2011 | Sakaguchi et al. |
| 7,981,512 | B2 | 7/2011 | Tamori et al. |
| 7,981,950 | B2 | 7/2011 | O'Donnell et al. |
| 7,985,795 | B2 | 7/2011 | Bobsein et al. |
| 7,985,809 | B2 | 7/2011 | Krawczyk et al. |
| 7,989,082 | B2 | 8/2011 | Vanrheenen |
| 7,989,505 | B2 | 8/2011 | Hu et al. |
| 7,998,531 | B2 | 8/2011 | Wevers et al. |
| 7,999,030 | B2 | 8/2011 | Thames et al. |
| 7,999,040 | B2 | 8/2011 | Patil et al. |
| 8,007,978 | B2 | 8/2011 | Klier et al. |
| 8,008,396 | B2 | 8/2011 | Rohrbach et al. |
| 8,013,058 | B2 | 9/2011 | Ahn et al. |
| 8,013,068 | B2 | 9/2011 | Beckley et al. |
| 8,013,092 | B1 | 9/2011 | Krajnik et al. |
| 8,025,758 | B2 | 9/2011 | Loehden et al. |
| 8,034,869 | B2 | 10/2011 | Bobsein et al. |
| 8,034,871 | B2 | 10/2011 | Bochnik et al. |
| 8,043,476 | B2 | 10/2011 | Haigh et al. |
| 8,048,961 | B2 | 11/2011 | Arriola et al. |
| 8,053,503 | B2 | 11/2011 | Moncla et al. |
| 8,058,349 | B2 | 11/2011 | Montoya-Goni et al. |
| 8,062,745 | B2 | 11/2011 | McGee et al. |
| 8,062,994 | B2 | 11/2011 | Masuda et al. |
| 8,063,128 | B2 | 11/2011 | Moncla et al. |
| 8,063,143 | B2 | 11/2011 | Morita et al. |
| 8,071,658 | B2 | 12/2011 | Zhou et al. |
| 8,080,612 | B2 | 12/2011 | Troy et al. |
| 8,084,543 | B2 | 12/2011 | Lafleur et al. |
| 8,088,252 | B2 | 1/2012 | Farwaha et al. |
| 8,088,547 | B2 | 1/2012 | Hu et al. |
| 8,092,727 | B2 | 1/2012 | Maurer et al. |
| 8,124,689 | B2 | 2/2012 | Loubert et al. |
| 8,128,946 | B2 | 3/2012 | Kawamura et al. |
| 8,129,442 | B2 | 3/2012 | Ueyama et al. |
| 8,133,961 | B2 | 3/2012 | Hsu et al. |
| 8,133,963 | B2 | 3/2012 | Pierini et al. |
| 8,137,754 | B2 | 3/2012 | Lai et al. |
| 8,153,721 | B2 | 4/2012 | Balk et al. |
| 8,158,711 | B2 | 4/2012 | Moncla et al. |
| 8,158,713 | B2 | 4/2012 | Finegan et al. |
| 8,163,206 | B2 | 4/2012 | Chang et al. |
| 8,163,837 | B2 | 4/2012 | Moncla et al. |
| 8,168,736 | B2 | 5/2012 | Schmitt et al. |
| 8,178,168 | B2 | 5/2012 | O'Neill et al. |

(56) References Cited

U.S. PATENT DOCUMENTS

| | | |
|---|---|---|
| 8,178,600 B2 | 5/2012 | Kelly |
| 8,178,624 B2 | 5/2012 | Schultes et al. |
| 8,192,844 B2 | 6/2012 | Numrich et al. |
| 8,193,275 B2 | 6/2012 | Moncla et al. |
| 8,193,278 B2 | 6/2012 | Demarest et al. |
| 8,198,376 B2 | 6/2012 | Kobushi et al. |
| 8,202,946 B2 | 6/2012 | Patil et al. |
| 8,207,267 B2 | 6/2012 | Von Tschammer et al. |
| 8,211,982 B2 | 7/2012 | Harris et al. |
| 8,227,085 B2 | 7/2012 | Kishikawa et al. |
| 8,227,520 B2 | 7/2012 | Shirasaki et al. |
| 8,227,542 B2 | 7/2012 | Bardman et al. |
| 8,227,549 B2 | 7/2012 | Schultes et al. |
| 8,232,334 B2 | 7/2012 | Kelly et al. |
| 8,232,336 B2 | 7/2012 | Moncla et al. |
| 8,236,431 B2 | 8/2012 | Mukkamala |
| 8,236,975 B2 | 8/2012 | Hook et al. |
| 8,252,425 B2 | 8/2012 | Lee et al. |
| 8,263,679 B2 | 9/2012 | Zhou et al. |
| 8,263,720 B1 | 9/2012 | Salamone et al. |
| 8,273,822 B2 | 9/2012 | Rossi et al. |
| 8,283,404 B2 | 10/2012 | Allen et al. |
| 8,299,153 B2 | 10/2012 | Kelly |
| 8,304,485 B2 | 11/2012 | Allen et al. |
| 8,304,517 B2 | 11/2012 | Morimitsu et al. |
| 8,304,563 B2 | 11/2012 | Kruper et al. |
| 8,308,855 B2 | 11/2012 | Togashi et al. |
| 8,309,634 B2 | 11/2012 | Beyer et al. |
| 8,309,651 B2 | 11/2012 | Finch et al. |
| 8,309,669 B2 | 11/2012 | Schmitt et al. |
| 8,313,604 B2 | 11/2012 | Oshima et al. |
| 8,324,311 B2 | 12/2012 | Wasserman et al. |
| 8,329,797 B2 | 12/2012 | Eaton et al. |
| 8,334,021 B2 | 12/2012 | Hoefler et al. |
| 8,334,346 B2 | 12/2012 | Hibben |
| 8,344,046 B2 | 1/2013 | Tucker et al. |
| 8,349,929 B2 | 1/2013 | Kainz et al. |
| 8,357,749 B2 | 1/2013 | Malotky et al. |
| 8,377,852 B2 | 2/2013 | Ahn et al. |
| 8,389,113 B2 | 3/2013 | Ambrose et al. |
| 8,404,759 B2 | 3/2013 | Phelan |
| 8,415,404 B2 | 4/2013 | Nicolson et al. |
| 8,415,422 B2 | 4/2013 | Schuetz et al. |
| 8,426,637 B2 | 4/2013 | Koestner et al. |
| 8,431,229 B2 | 4/2013 | Schmitt et al. |
| 8,440,300 B2 | 5/2013 | Sharavanan et al. |
| 8,470,120 B2 | 6/2013 | Killat et al. |
| 8,475,878 B2 | 7/2013 | Claasen et al. |
| 8,491,729 B2 | 7/2013 | Bammel et al. |
| 8,492,465 B2 | 7/2013 | Seibold et al. |
| 8,492,472 B2 | 7/2013 | Elizalde et al. |
| 8,492,576 B2 | 7/2013 | Lai et al. |
| 8,497,337 B2 | 7/2013 | Herfert et al. |
| 8,501,832 B2 | 8/2013 | Tighe et al. |
| 8,507,622 B2 | 8/2013 | Lemonds et al. |
| 8,513,356 B1 | 8/2013 | Sharma et al. |
| 8,519,043 B2 | 8/2013 | Hartig et al. |
| 8,524,800 B2 | 9/2013 | Phelan |
| 8,530,362 B2 | 9/2013 | Nungesser et al. |
| 8,530,579 B2 | 9/2013 | Arriola et al. |
| 8,530,591 B2 | 9/2013 | Yang et al. |
| 8,540,358 B2 | 9/2013 | Mozel et al. |
| 8,552,119 B2 | 10/2013 | Hibben |
| 8,557,921 B2 | 10/2013 | Arriola et al. |
| 8,580,875 B2 | 11/2013 | Lee et al. |
| 8,592,518 B2 | 11/2013 | Bailey et al. |
| 8,598,369 B2 | 12/2013 | Hauck et al. |
| 8,609,759 B2 | 12/2013 | Fasano et al. |
| 8,609,779 B2 | 12/2013 | Harris et al. |
| 8,609,780 B2 | 12/2013 | Misiak et al. |
| 8,609,795 B2 | 12/2013 | Sugimoto et al. |
| 8,641,846 B2 | 2/2014 | Parsons et al. |
| 8,648,130 B2 | 2/2014 | Hasegawa et al. |
| 8,658,742 B2 | 2/2014 | Dombrowski et al. |
| 8,697,810 B2 | 4/2014 | Vogel et al. |
| 8,703,194 B2 | 4/2014 | Liu et al. |
| 8,709,543 B2 | 4/2014 | Lai et al. |
| 8,710,150 B2 | 4/2014 | Chang et al. |
| 8,722,787 B2 | 5/2014 | Romick et al. |
| 8,733,369 B2 | 5/2014 | Rees et al. |
| 8,734,817 B2 | 5/2014 | Hossainy et al. |
| 8,741,427 B2 | 6/2014 | Kim et al. |
| 8,742,016 B2 | 6/2014 | Besser et al. |
| 8,747,969 B2 | 6/2014 | Lu |
| 8,765,822 B2 | 7/2014 | Braun et al. |
| 8,779,051 B2 | 7/2014 | Kisin et al. |
| 8,779,053 B2 | 7/2014 | Lundgard et al. |
| 8,790,632 B2 | 7/2014 | Arthur |
| 8,791,190 B2 | 7/2014 | Pressley et al. |
| 8,802,238 B2 | 8/2014 | Zheng et al. |
| 2001/0044482 A1 | 11/2001 | Hu et al. |
| 2001/0056153 A1 | 12/2001 | Nakagome |
| 2002/0037956 A1 | 3/2002 | Avramidis et al. |
| 2002/0077435 A1 | 6/2002 | DeSimone et al. |
| 2002/0103278 A1 | 8/2002 | Krajnik et al. |
| 2002/0115795 A1 | 8/2002 | Shang et al. |
| 2002/0155235 A1 | 10/2002 | Taylor et al. |
| 2002/0168533 A1 | 11/2002 | Taylor et al. |
| 2003/0065068 A1 | 4/2003 | Inukai et al. |
| 2003/0139496 A1 | 7/2003 | Sugishima et al. |
| 2003/0147835 A1 | 8/2003 | Munro et al. |
| 2003/0158324 A1 | 8/2003 | Maxim |
| 2003/0224184 A1 | 12/2003 | Hermes et al. |
| 2003/0225183 A1 | 12/2003 | De Putter et al. |
| 2003/0232933 A1 | 12/2003 | Lagneaux et al. |
| 2004/0044124 A1 | 3/2004 | Hutter et al. |
| 2004/0054026 A1 | 3/2004 | Kunzler et al. |
| 2004/0054043 A1 | 3/2004 | Friedrich et al. |
| 2005/0075428 A1 | 4/2005 | Ddamulira et al. |
| 2005/0129769 A1 | 6/2005 | Barry et al. |
| 2005/0176874 A1 | 8/2005 | Panades et al. |
| 2005/0215746 A1 | 9/2005 | DeSimone et al. |
| 2005/0238884 A1 | 10/2005 | Peters et al. |
| 2005/0239957 A1 | 10/2005 | Pillsbury et al. |
| 2005/0288410 A1 | 12/2005 | Farcet |
| 2006/0004140 A1 | 1/2006 | Asano et al. |
| 2006/0069171 A1 | 3/2006 | Prokopowicz et al. |
| 2006/0079609 A1 | 4/2006 | Nishioka et al. |
| 2006/0089453 A1 | 4/2006 | Pajerski |
| 2006/0099347 A1 | 5/2006 | Sugeta et al. |
| 2006/0100352 A1 | 5/2006 | Arnold et al. |
| 2006/0135649 A1 | 6/2006 | Jedlicka et al. |
| 2006/0167206 A1 | 7/2006 | Maier et al. |
| 2006/0235124 A1 | 10/2006 | Wehner et al. |
| 2006/0247367 A1 | 11/2006 | Guo et al. |
| 2007/0027249 A1 | 2/2007 | Killilea |
| 2007/0032605 A1 | 2/2007 | Harashina |
| 2007/0055017 A1 | 3/2007 | Schultes et al. |
| 2007/0066777 A1 | 3/2007 | Bzowej et al. |
| 2007/0093575 A1 | 4/2007 | Murakami et al. |
| 2007/0129486 A1 | 6/2007 | Klein et al. |
| 2007/0142565 A1 | 6/2007 | Chaudhary et al. |
| 2007/0149641 A1 | 6/2007 | Goupil et al. |
| 2007/0149711 A1 | 6/2007 | Chaudhary et al. |
| 2007/0155862 A1 | 7/2007 | Haerzschel et al. |
| 2007/0173613 A1 | 7/2007 | Chaudhary et al. |
| 2007/0219315 A1 | 9/2007 | Braun |
| 2007/0238824 A1 | 10/2007 | Smak et al. |
| 2007/0238827 A1 | 10/2007 | Brady et al. |
| 2007/0244238 A1 | 10/2007 | Desor et al. |
| 2007/0265386 A1 | 11/2007 | Mallo et al. |
| 2007/0270065 A1 | 11/2007 | Bordes |
| 2007/0299180 A1 | 12/2007 | Joecken |
| 2007/0299242 A1 | 12/2007 | Faecke et al. |
| 2008/0014360 A1 | 1/2008 | Kim |
| 2008/0058473 A1 | 3/2008 | Freidzon et al. |
| 2008/0114125 A1 | 5/2008 | Bzowej et al. |
| 2008/0145564 A1 | 6/2008 | Allam et al. |
| 2008/0176968 A1 | 7/2008 | VanSumeren et al. |
| 2008/0262144 A1 | 10/2008 | Glockner et al. |
| 2008/0293848 A1 | 11/2008 | Tomko et al. |
| 2009/0054546 A1 | 2/2009 | Glockner et al. |
| 2009/0069491 A1 | 3/2009 | Costeux et al. |
| 2009/0075046 A1 | 3/2009 | Fox et al. |

(56) References Cited

U.S. PATENT DOCUMENTS

| | | |
|---|---|---|
| 2009/0111935 A1 | 4/2009 | Fujii et al. |
| 2009/0118416 A1 | 5/2009 | Nakamae et al. |
| 2009/0163635 A1 | 6/2009 | Raynolds et al. |
| 2009/0170973 A1 | 7/2009 | Mattiasson et al. |
| 2009/0264586 A1 | 10/2009 | Mestach et al. |
| 2010/0029857 A1 | 2/2010 | Soddemann et al. |
| 2010/0040668 A1 | 2/2010 | Riman et al. |
| 2010/0041820 A1 | 2/2010 | Eslinger et al. |
| 2010/0041821 A1 | 2/2010 | Eslinger et al. |
| 2010/0065498 A1 | 3/2010 | Charkoudian et al. |
| 2010/0065499 A1 | 3/2010 | Fernandez-Lahore et al. |
| 2010/0068541 A1 | 3/2010 | El A'mma et al. |
| 2010/0068958 A1 | 3/2010 | Carson et al. |
| 2010/0075043 A1 | 3/2010 | Kaimoto et al. |
| 2010/0075079 A1 | 3/2010 | Bernal-Lara et al. |
| 2010/0090372 A1 | 4/2010 | Ishikawa et al. |
| 2010/0093913 A1 | 4/2010 | Jones et al. |
| 2010/0129635 A1 | 5/2010 | Drzyzga et al. |
| 2010/0154146 A1 | 6/2010 | Shah et al. |
| 2010/0160480 A1 | 6/2010 | Tomko et al. |
| 2010/0160496 A1 | 6/2010 | Son |
| 2010/0160551 A1 | 6/2010 | Marlow et al. |
| 2010/0179277 A1 | 7/2010 | Soddemann et al. |
| 2010/0197863 A1 | 8/2010 | Bouquet et al. |
| 2010/0210784 A1 | 8/2010 | Schmitt et al. |
| 2010/0273005 A1 | 10/2010 | Kramer et al. |
| 2010/0273018 A1 | 10/2010 | Scheerder et al. |
| 2010/0273924 A1 | 10/2010 | Burckhardt |
| 2010/0273929 A1 | 10/2010 | Kitagawa et al. |
| 2010/0280183 A1* | 11/2010 | Kou ............ B01F 17/005 525/218 |
| 2010/0286299 A1 | 11/2010 | Casati et al. |
| 2010/0286325 A1 | 11/2010 | Balk et al. |
| 2010/0297557 A1 | 11/2010 | Cameron et al. |
| 2010/0323202 A1 | 12/2010 | Burckhardt et al. |
| 2010/0330376 A1 | 12/2010 | Trksak et al. |
| 2011/0009515 A1 | 1/2011 | Casati |
| 2011/0027600 A1* | 2/2011 | Hayes ............ C08L 33/08 428/500 |
| 2011/0033700 A1 | 2/2011 | Caylus |
| 2011/0064686 A1 | 3/2011 | Zhang et al. |
| 2011/0076492 A1 | 3/2011 | Fujita et al. |
| 2011/0079352 A1 | 4/2011 | Shah et al. |
| 2011/0104508 A1 | 5/2011 | Wang et al. |
| 2011/0118379 A1 | 5/2011 | Tighe et al. |
| 2011/0124795 A1 | 5/2011 | Van de Zande et al. |
| 2011/0135871 A1 | 6/2011 | Yamamoto et al. |
| 2011/0136975 A1 | 6/2011 | Breiner et al. |
| 2011/0144267 A1 | 6/2011 | Schuetz et al. |
| 2011/0165398 A1* | 7/2011 | Shoemake ......... C08J 5/043 428/220 |
| 2011/0189253 A1 | 8/2011 | Haddock et al. |
| 2011/0196084 A1 | 8/2011 | Nabuurs et al. |
| 2011/0217540 A1 | 9/2011 | Sandkuehler et al. |
| 2011/0218264 A1 | 9/2011 | Casati et al. |
| 2011/0236587 A1 | 9/2011 | Clark et al. |
| 2011/0311631 A1 | 12/2011 | Baer et al. |
| 2012/0026238 A1 | 2/2012 | Ganapathiappan et al. |
| 2012/0045485 A1 | 2/2012 | Gan et al. |
| 2012/0071577 A1 | 3/2012 | Pfeffer et al. |
| 2012/0077932 A1 | 3/2012 | Pfeffer et al. |
| 2012/0101181 A1 | 4/2012 | Munshi et al. |
| 2012/0121903 A1 | 5/2012 | Betremieux et al. |
| 2012/0128743 A1 | 5/2012 | Hawkett et al. |
| 2012/0140008 A1 | 6/2012 | Ganapathiappan et al. |
| 2012/0142848 A1 | 6/2012 | Bzowej et al. |
| 2012/0152459 A1 | 6/2012 | Avramidis |
| 2012/0156892 A1 | 6/2012 | Mevellec et al. |
| 2012/0157352 A1 | 6/2012 | Musa et al. |
| 2012/0165428 A1 | 6/2012 | Tilara et al. |
| 2012/0168384 A1 | 7/2012 | Anzai et al. |
| 2012/0172478 A1 | 7/2012 | Chang et al. |
| 2012/0178884 A1 | 7/2012 | Cavallin |
| 2012/0225110 A1 | 9/2012 | Hashino et al. |
| 2012/0237464 A1 | 9/2012 | Ahn et al. |
| 2012/0245267 A1 | 9/2012 | Blanchard et al. |
| 2012/0252972 A1 | 10/2012 | Balk et al. |
| 2012/0288630 A1 | 11/2012 | Charkoudian et al. |
| 2012/0315265 A1 | 12/2012 | Lai et al. |
| 2013/0005887 A1 | 1/2013 | Lellis et al. |
| 2013/0055485 A1 | 3/2013 | Zanetta et al. |
| 2013/0059119 A1 | 3/2013 | Campeau et al. |
| 2013/0065976 A1 | 3/2013 | Morita et al. |
| 2013/0072405 A1 | 3/2013 | Favero et al. |
| 2013/0122299 A1 | 5/2013 | Rand et al. |
| 2013/0123436 A1 | 5/2013 | Rand et al. |
| 2013/0129996 A1 | 5/2013 | Ahn et al. |
| 2013/0138056 A1 | 5/2013 | Kawamura et al. |
| 2013/0143039 A1 | 6/2013 | Wilbur et al. |
| 2013/0143979 A1 | 6/2013 | Kamiyama et al. |
| 2013/0149487 A1 | 6/2013 | Lunsford et al. |
| 2013/0156961 A1 | 6/2013 | Heulings et al. |
| 2013/0172504 A1 | 7/2013 | Phelan |
| 2013/0178549 A1 | 7/2013 | Ahn et al. |
| 2013/0178569 A1 | 7/2013 | Guy et al. |
| 2013/0183520 A1 | 7/2013 | Natori |
| 2013/0190468 A1 | 7/2013 | Meier et al. |
| 2013/0203884 A1 | 8/2013 | Blomker et al. |
| 2013/0208429 A1 | 8/2013 | Liu |
| 2013/0231438 A1 | 9/2013 | Kim et al. |
| 2013/0237673 A1 | 9/2013 | Saint-Gerard et al. |
| 2013/0253107 A1 | 9/2013 | Iyer et al. |
| 2013/0263995 A1 | 10/2013 | Lutz et al. |
| 2013/0272943 A1 | 10/2013 | Braga |
| 2013/0289135 A1 | 10/2013 | Tighe et al. |
| 2017/0037263 A1* | 2/2017 | Iyer ............ C09D 5/02 |

FOREIGN PATENT DOCUMENTS

| | | |
|---|---|---|
| WO | 92/21720 | 12/1992 |
| WO | 2007/012432 | 2/2007 |

OTHER PUBLICATIONS

ASTM International, Standard Specification for Liquid Applied Acrylic Coating Used in Roofing, West Conshohocken, PA, pp. 1-3, Jun. 2005.

* cited by examiner

ACRYLIC DISPERSION-BASED COATING COMPOSITIONS

CROSS-REFERENCE TO RELATED APPLICATIONS

This application claims the benefit of U.S. Provisional Application No. 61/754,241 filed Jan. 18, 2013, the disclosure of which is hereby incorporated by reference in its entirety.

BACKGROUND

Desirable properties for coating compositions suitable for use in roofing applications are set, for example, by the American Society for Testing Materials (ASTM). ASTM D 6083-05 specifies that desirable properties of roof coatings include high tensile strength, high elongation, high flexibility, and mandrel bend performance at low temperatures. At the present time, roof coatings that meet these performance properties are typically based on polyurethane, silicone or polyvinyl chloride (PVC) polymers or copolymers. However, these coatings are often solvent borne and expensive. Thus, there is a need in the art to provide coating compositions that are able to achieve and even exceed the desired performance properties set forth in ASTM D 6083-05 at a cost effective level.

SUMMARY

Coating compositions and methods for their preparation are described. The coating compositions comprise a first copolymer and a second copolymer. In some embodiments, the coating compositions can include a first copolymer produced by emulsion polymerization and derived from one or more monomers including one or more (meth)acrylates, one or more acid monomers, and optionally styrene. The first copolymer can have a Tg from −50° C. to −23° C. and is present in an amount of 10-50% by weight based on the total polymer content. The coating compositions also include a second copolymer produced by emulsion polymerization and derived from one or more monomers including one or more (meth)acrylates, one or more acid monomers, and optionally styrene. The second copolymer can have a Tg from −15° C. to 25° C. and is present in an amount of 50-90% by weight based on the total polymer content. The coating compositions can further include a filler comprising at least one pigment, a pigment dispersing agent, a thickener, a defoamer, a surfactant, and water. The coating composition can have a viscosity of from 12,000 to 85,000 cps at 25° C., a volume solids of greater than 50%, and a weight solids of greater than 60%. Also, the coating composition, when applied as a film, dried and weathered for 1000 hours, can pass the mandrel bend test set forth in ASTM D 6083-05 at at −26° C. and can optionally have a tensile strength of greater than 300 psi.

The at least one first copolymer can be present in an amount of 20-30% by weight based on the total polymer content. In some examples, the first copolymer has a Tg of from −36° C. to −23° C. The second copolymer can have a Tg of from −12° C. to 0° C. In some examples, at least one of the first copolymer and the second copolymer is a styrene acrylic copolymer. In some examples, the first copolymer and the second copolymer are pure acrylics. The first copolymer and the second copolymer can each be derived from at least one low Tg monomer selected from the group consisting of butyl acrylate and 2-ethylhexyl acrylate. Optionally, at least one of the first copolymer and the second copolymer are further derived from at least one high Tg monomer selected from the group consisting of methyl methacrylate and styrene. At least one of the first copolymer and the second copolymer can be derived from a crosslinkable monomer. The acid monomers in the first copolymer and the second copolymer can each be selected from the group consisting acrylic acid, methacrylic acid, itaconic acid, maleic acid, fumaric acid, and mixtures thereof. At least one of the first copolymer and the second copolymer can be further derived from (meth)acrylamide.

The coating composition can further include one or more of a biocide, a dispersing agent, and a coalescing agent. In some examples, the coating composition can further include a quick setting additive (e.g., a polyamine such as polyethyleneimine or a derivatized polyamine such as an alkoxylated polyethyleneimine).

In other embodiments, the coating compositions can comprise a composition including a first copolymer and a second copolymer. In these examples, the first copolymer is produced by emulsion polymerization and derived from one or more monomers including one of more of butyl acrylate and 2-ethylhexyl acrylate, one or more acid monomers, a crosslinkable monomer, and optionally styrene or methyl methacrylate. The first copolymer can have a Tg from −36° C. to −23° C. In these examples, the second copolymer is produced by emulsion polymerization and derived from one or more monomers including one of more of butyl acrylate and 2-ethylhexyl acrylate, one or more acid monomers, a crosslinkable monomer, and optionally styrene or methyl methacrylate. The second copolymer can have a Tg from −12° C. to 0° C. The first copolymer and the second copolymer can be dispersed in an aqueous medium.

Also described herein are dried coatings. The dried coatings can be formed by drying a composition as described herein.

Further described herein are methods of coating a substrate. The method can include applying a coating composition as described herein to a surface. In some examples, the surface is a roof surface. In some examples, the surface is a wall.

Methods of producing a coating are also provided herein. The methods include mixing a composition as described herein with a filler comprising at least one pigment, a dispersing agent, a thickener, a defoamer, and a stabilizer.

The details of one or more embodiments are set forth in the description below. Other features, objects, and advantages will be apparent from the description and from the claims.

DETAILED DESCRIPTION

Acrylic dispersion-based coating compositions and methods of their preparation and use are described herein. The coating compositions include a first copolymer and a second copolymer. The first copolymer described herein can be derived from one or more monomers including one or more (meth)acrylates, one or more acid monomers, and optionally styrene. The second copolymer described herein can be derived from one or more monomers including one or more (meth)acrylates, one or more acid monomers, and optionally styrene.

The one or more (meth)acrylates can include esters of α,β-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C12, C1-C8, or C1-C4 alkanols). In some examples, the one or more (meth)acrylates for preparing the first copolymer and/or second copolymer are selected from butyl acrylate, 2-ethylhexyl acrylate, methyl methacrylate, and mixtures of these.

The one or more acid monomers can include α,β-monoethylenically unsaturated mono- and dicarboxylic acids (e.g., acrylic acid, methacrylic acid, itaconic acid, maleic acid, fumaric acid, crotonic acid, dimethacrylic acid, ethylacrylic acid, allylacetic acid, vinylacetic acid, mesaconic acid, methylenemalonic acid, or citraconic acid). In some examples, the one or more acid monomers for preparing the first copolymer and/or second copolymer are selected from the group consisting acrylic acid, methacrylic acid, itaconic acid, maleic acid, fumaric acid, and mixtures of these.

Optionally, the first copolymer and the second copolymer are each derived from at least one low glass transition temperature (Tg) monomer. As used herein, a low Tg monomer refers to a monomer having a Tg value of less than −40° C. for the corresponding homopolymer. Examples of suitable low Tg monomers include butyl acrylate (Tg value of −43° C.) and 2-ethylhexyl acrylate (Tg value of −58° C.).

Optionally, the first copolymer and the second copolymer are each derived from at least one high Tg monomer. As used herein, a high Tg monomer refers to a monomer having a Tg value of greater than 40° C. for the corresponding homopolymer. Examples of suitable high Tg monomers include methyl methacrylate (Tg value of 105° C.) and styrene (Tg value of 100° C.).

In some embodiments, at least one of the first copolymer and the second copolymer is further derived from an acrylamides or an alkyl-substituted acrylamide. Suitable examples include N-tert-butylacrylamide and N-methyl (meth)acrylamide. In some embodiments, at least one of the first copolymer and the second copolymer is further derived from (meth)acrylamide.

Optionally, at least one of the first copolymer and the second copolymer is derived from a crosslinkable monomer. For example, the crosslinkable monomer can include diacetone acrylamide (DAAM) or a self-crosslinking monomer such as a monomer comprising 1,3-diketo groups (e.g., acetoacetoxyethyl(meth)acrylate) or a silane crosslinker. Examples of suitable silane crosslinkers include 3-methacryloxypropyl trimethoxysilane, 3-mercaptopropyl trimethoxysilane, vinyltriethoxysilane, and polyvinyl-siloxane oligomers such as DYNASYLAN 6490, a polyvinyl siloxane oligomer derived from vinyltrimethoxysilane, and DYNASYLAN 6498, a polyvinyl siloxane oligomer derived from vinyltriethoxysilane, both commercially available from Evonik Degussa GmbH (Essen, Germany) The polyvinyl siloxane oligomer can have the following structure:

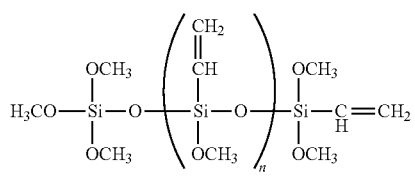

wherein n is an integer from 1 to 50 (e.g., 10). Crosslinkable monomers as described herein can further include monomers such as divinylbenzene; 1,4-butanediol diacrylate; methacrylic acid anhydride; and monomers containing urea groups (e.g., ureidoethyl(meth)acrylate, acrylamidoglycolic acid, and methacrylamidoglycolate methyl ether. Additional examples of crosslinkable monomers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinkable monomers include diesters or triesters of dihydric and trihydric alcohols with α,β-monoethylenically unsaturated monocarboxylic acids (e.g., di(meth)acrylates, tri(meth) acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. In some examples, the first copolymer and/or the second copolymer can include from 0 to 5% by weight of one or more crosslinkable monomers.

The first copolymer and/or second copolymer can further include additional monomers. Further examples of additional monomers include vinylaromatics such as α- and p-methylstyrene, α-butylstyrene, 4-n-butylstyrene, 4-n-decylstyrene, and vinyltoluene; conjugated dienes (e.g., isoprene); anhydrides of α,β-monoethylenically unsaturated mono- and dicarboxylic acids (e.g., maleic anhydride, itaconic anhydride, and methylmalonic anhydride); (meth) acrylonitrile; vinyl and vinylidene halides (e.g., vinyl chloride and vinylidene chloride); vinyl esters of C1-C18 mono- or dicarboxylic acids (e.g., vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl(meth)acrylate, hydroxypropyl(meth)acrylate, and methylpolyglycol acrylate); and monomers containing glycidyl groups (e.g., glycidyl methacrylate).

Further examples of additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); phosphorus-containing monomers (e.g., dihydrogen phosphate esters of alcohols in which the alcohol contains a polymerizable vinyl or olefenic group, allyl phosphate, phosphoalkyl(meth)acrylates such as 2-phosphoethyl(meth)acrylate (PEM), 2-phosphopropyl(meth)acrylate, 3-phosphopropyl(meth)acrylate, and phosphobutyl(meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl(meth)acrylate, 3-hydroxypropyl(meth)acrylate, ethylene oxide condensates of (meth)acrylates, $H_2C=C(CH_3)COO(CH_2CH_2O)_nP(O)(OH)_2$, and analogous propylene and butylene oxide condensates, where n is an amount of 1 to 50, phosphoalkyl crotonates, phosphoalkyl maleates, phosphoalkyl fumarates, phosphodialkyl(meth)acrylates, phosphodialkyl crotonates, vinyl phosphonic acid, allyl phosphonic acid, 2-acrylamido-2methylpropanephosphinic acid, α-phosphonostyrene, 2-methylacrylamido-2-methylpropanephosphinic acid, (hydroxy)phosphinylalkyl(meth)acrylates, (hydroxy)phosphinylmethyl methacrylate, and combinations thereof); alkylaminoalkyl(meth)acrylates or alkylaminoalkyl(meth)acrylamides or quaternization products thereof (e.g., 2-(N,N-dimethylamino)ethyl(meth)acrylate, 3-(N,N-dimethylamino)propyl(meth)acrylate, 2-(N,N,N-trimethylammonium)ethyl(meth)acrylate chloride, 2-dimethylaminoethyl(meth)acrylamide, 3-dimethylaminopropyl(meth)acrylamide, and 3-trimethylammoniumpropyl (meth)acrylamide chloride); allyl esters of C1-C30 monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

The first copolymer and the second copolymer can independently be pure acrylics, styrene acrylics, or vinyl acrylics. In some embodiments, the first copolymer is a styrene acrylic copolymer (i.e., the first copolymer is a styrene acrylic copolymer, the second copolymer is a styrene acrylic copolymer, or both the first copolymer and the second copolymer are styrene acrylic copolymers). In other embodiments, at least one of the first copolymer and the second copolymer is a pure acrylic (i.e., the first copolymer is a pure acrylic, the second copolymer is a pure acrylic, or both the first copolymer and second copolymer are pure acrylics).

The first copolymer and the second copolymer can be prepared by polymerizing the monomers using free-radical emulsion polymerization. The monomers for the first copolymer and the second copolymer can be prepared as aqueous dispersions. The emulsion polymerization temperature is generally from 30° C. to 95° C. or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

The first or second copolymer can each independently be produced by single stage polymerization or multiple stage polymerization. In some embodiments, the first copolymer and the second copolymer are each copolymerized separately to produce a first dispersion including a plurality of polymer particles including the first copolymer and a second dispersion comprising a plurality of polymer particles including the second copolymer. The first and second dispersions can then be combined to provide a dispersion including the first and second copolymers. In some embodiments, the first copolymer and the second copolymer are provided in the same polymer particle by using multiple stage polymerization such that one of the first copolymer and second copolymer can be present as a first stage copolymer (e.g., as a core in a core/shell polymer particle) and one of the first copolymer and second copolymer can be present as a second stage copolymer (e.g., as a shell in a core/shell polymer particle).

One or more surfactants can be included in the aqueous dispersions to improve certain properties of the dispersions, including particle stability. For example, sodium laureth sulfate and alkylbenzene sulfonic acid or sulfonate surfactants could be used. Examples of commercially available surfactants include Calfoam® ES-303, a sodium laureth sulfate, and Calfax® DB-45, a sodium dodecyl diphenyl oxide disulfonate, both available from Pilot Chemical Company (Cincinnati, Ohio). In general, the amount of surfactants employed can be from 0.01 to 5%, based on the total amount of the monomers to be polymerized.

Small amounts (e.g., from 0.01 to 2% by weight based on the total monomer weight) of molecular weight regulators, such as a mercaptan, can optionally be used. Such substances are preferably added to the polymerization zone in a mixture with the monomers to be polymerized and are considered part of the total amount of unsaturated monomers used in the copolymers.

The first copolymer can have a Tg value of less than −20° C. as measured by differential scanning calorimetry (DSC) by measuring the midpoint temperature using ASTM D 3418-08. For example, the Tg of the first copolymer can be from −50° C. to −23° C., −40° C. to −25° C., or −33° C. to −26° C. In some examples, the Tg of the first copolymer is from −36° C. to −23° C. The second copolymer can have a Tg value of greater than −15° C. For example, the Tg of the second copolymer can be from −12° C. to 25° C., −9° C. to 5° C., or −5° C. to 0° C. In some examples, the Tg of the first copolymer is from −12° C. to 0° C.

The first copolymer can be present in the coating composition in an amount of 10-50% by weight based on the total polymer content. For example, the first copolymer can be present in the coating composition in an amount of 15-35% or 20-30% by weight based on the polymer content. The second copolymer can be present in the coating composition in an amount of 50-90% by weight based on the total polymer content. For example, the second copolymer can be present in the coating composition in an amount of 65-85% or 70-80% by weight based on the total polymer content.

In some embodiments, the first copolymer and the second copolymer can be dispersed in an aqueous medium to form an aqueous dispersion. The aqueous dispersion can be used to form the coating composition. The coating composition can further include at least one filler such as a pigment or extender. The term "pigment" as used herein includes compounds that provide color or opacity to the coating composition. Examples of suitable pigments include metal oxides, such as titanium dioxide, zinc oxide, iron oxide, or combinations thereof. The at least one pigment can be selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Examples of commercially titanium dioxide pigments are KRONOS® 2101, KRONOS® 2310, available from Kronos WorldWide, Inc., TI-PURE® R-900, available from DuPont, or TIONA® AT1 commercially available from Millenium Inorganic Chemicals. Titanium dioxide is also available in concentrated dispersion form. An example of a titanium dioxide dispersion is KRONOS® 4311, also available from Kronos WorldWide, Inc. Suitable pigment blends of metal oxides are sold under the marks Minex® (oxides of silicon, aluminum, sodium and potassium commercially available from Unimin Specialty Minerals), Celite® (aluminum oxide and silicon dioxide commercially available from Celite Company), and Atomite® (commercially available from Imerys Performance Minerals). Exemplary fillers also include clays such as attapulgite clays and kaolin clays including those sold under the Attagel® and Ansilex® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), mica (hydrous aluminum potassium silicate), pyrophyllite (aluminum silicate hydroxide), perlite, baryte (barium sulfate), Wollastonite (calcium metasilicate), and combinations thereof. More preferably, the at least one filler includes $TiO_2$, $CaCO_3$, and/or a clay.

Generally, the mean particle sizes of the filler ranges from about 0.01 to about 50 microns. For example, the $TiO_2$ particles used in the aqueous coating composition typically have a mean particle size of from about 0.15 to about 0.40 microns. The filler can be added to the aqueous coating composition as a powder or in slurry form. The filler is preferably present in the aqueous coating composition in an amount from about 5 to about 50 percent by weight, more preferably from about 10 to about 40 percent by weight (i.e. the weight percentage of the filler based on the total weight of the coating composition).

Examples of suitable pigment dispersing agents are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener.

Defoamers serve to minimize frothing during mixing and/or application of the coating composition. Suitable defoamers include organic defoamers such as mineral oils, silicone oils, and silica-based defoamers. Exemplary silicone oils include polysiloxanes, polydimethylsiloxanes, polyether modified polysiloxanes, and combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Suitable surfactants include nonionic surfactants and anionic surfactants. Examples of nonionic surfactants are alkylphenoxy polyethoxyethanols having alkyl groups of about 7 to about 18 carbon atoms, and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the composition comprises an anionic diphenyl oxide disulfonate surfactant, such as CALFAX® DB-45, commercially available from Pilot Chemical.

Optionally, the coating compositions can further include quick setting additives. Exemplary quick setting additives suitable for use in the coating compositions described herein includes polyamines (i.e., polymers formed from either an amine-group containing monomer or an imine monomer as polymerized units such as aminoalkyl vinyl ether or sulfides; acrylamide or acrylic esters, such as dimethylaminoethyl (meth)acrylate; N-(meth)acryloxyalkyl-oxazolidines such as poly(oxazolidinylethyl methacrylate), N-(meth)acryloxyalkyltetrahydro-1,3-oxazines, and monomers that readily generate amines by hydrolysis). Suitable polyamines can include, for example, poly(oxazolidinylethyl methacrylate), poly(vinylamine), or polyalkyleneimine (e.g., polyethyleneimine). In some embodiments, the quick setting additive is a derivatized polyamine such as an alkoxylated polyalkyleneimine (e.g., ethoxylated polyethyleneimine). Suitable derivatized polyamines are described in U.S. Application Ser. No. 61/714,497, filed Oct. 16, 2012, which is incorporated by reference herein in its entirety.

Other suitable additives that can optionally be incorporated into the composition include coalescing agents (coalescents), pH modifying agents, biocides, co-solvents and plasticizers, crosslinking agents, dispersing agents, rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, flatting agents, flocculants, humectants, insecticides, lubricants, odorants, oils, waxes and slip aids, soil repellants, stain resisting agents, and combinations thereof.

Suitable coalescents, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof.

Suitable biocides can be incorporated to inhibit the growth of bacteria and other microbes in the coating composition during storage. Exemplary biocides include 2-[(hydroxymethyl)amino]ethanol, 2-[(hydroxymethyl)amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OTT), 4,5-dichloro-2-n-octyl-3-isothiazolone, as well as acceptable salts and combinations thereof. Suitable biocides also include biocides that inhibit the growth of mold, mildew, and spores thereof in the coating. Examples of mildewcides include 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc. The biocide can alternatively be applied as a film to the coating and a commercially available film-forming biocide is Zinc Omadine® commercially available from Arch Chemicals, Inc.

Exemplary co-solvents and humectants include ethylene glycol, propylene glycol, diethylene glycol, and combinations thereof.

Exemplary crosslinking agents include dihydrazides (e.g., dihydrazides of adipic acid, succinic acid, oxalic acid, glutamic acid, or sebastic acid). The dihydrazides can be used, for example, to crosslink diacetone acrylamide or other crosslinkable monomers.

A coating composition can be produced by combining the components as described herein. The resulting coating compositions can have a viscosity of from 12,000 to 85,000 cps at 25° C. For example, the coating compositions can have a viscosity of from 15,000 to 80,000 cps, 20,000 to 75,000 cps, 25,000 to 70,000 cps, 30,000 to 65,000 cps, 35,000 to 60,000 cps, or 40,000 to 55,000 cps at 25° C.

The volume solids percentage of the coating composition can be greater than 50%. For example, the volume solids percentage of the coating composition can be greater than 55%, greater than 60%, greater than 65%, greater than 70%, or greater than 75%.

Optionally, the weight solids percentage of the coating composition can be greater than 60%. For example, the weight solids percentage can be greater than 65%, greater than 70%, greater than 75%, or greater than 80%.

In some embodiments, the coating composition can include the following components (based on total weight of the coating composition): water 6.8-17.2% by weight, propylene glycol 0.5-2.5% by weight, pigment dispersing agent 0.4-0.85% by weight, copolymer dispersion (at 55-65% by weight copolymer) 37.8-41.3% by weight, plasticizer 0-1.0% by weight, defoamer 0.3-1.4% by weight, non-ionic surfactant 0-0.1% by weight, thickener 0.1-0.4% by weight, titanium dioxide 3.0-11.2% by weight, zinc oxide 0-3.4% by weight, calcium carbonate 27.7-33.7% by weight, talc or kaolin 0-18.3% by weight, biocide 0.1-0.3% by weight, and ammonia 0.1-0.3% by weight.

The coating composition can be applied to a substrate (e.g., as a film) and allowed to dry to form a dried coating. Generally, coatings are formed by applying a coating composition described herein to a surface, and allowing the coating to dry to form a dried coating. In some embodiments, the surface can be a substantially horizontal surface such as a roof surface. In some embodiments, the surface can be a substantially vertical surface such as a wall. Optionally, the coating composition can be applied to floors to provide moisture control to provide crack-bridging properties.

The coating composition can be applied to a surface by any suitable coating technique, including spraying, rolling, brushing, or spreading. Coating compositions can be applied in a single coat, or in multiple sequential coats (e.g., in two coats or in three coats) as required for a particular application. Generally, the coating composition is allowed to dry under ambient conditions. However, in certain embodiments, the coating composition can be dried, for example, by heating and/or by circulating air over the coating.

The coating can be co-applied with a setting accelerator to decrease the setting time of the coating on a surface. Suitable setting accelerators include compounds, such as acids, which consume the volatile base and decrease coating setting time. For example, the setting accelerator can be a dilute acid, such as acetic acid or citric acid. Setting accelerators can be applied to a surface prior to coating application, applied simultaneously with the coating composition, or applied to the coating after it has been applied to a surface but prior to drying.

The coating thickness can vary depending upon the application of the coating. For example, the coating can have a dry thickness of at least 10 mils (e.g., at least 15 mils, at least 20 mils, at least 25 mils, at least 30 mils, or at least 40 mils). In some instances, the coating has a dry thickness of less than 100 mils (e.g., less than 90 mils, less than 80 mils, less than 75 mils, less than 60 mils, less than 50 mils, less than 40 mils, less than 35 mils, or less than 30 mils). In some embodiments, the coating has a dry thickness of between 10 mils and 100 mils. In certain embodiments, the coating has a dry thickness of between 10 mils and 40 mils.

The coating composition can be applied as a film, dried, subjected to an accelerated weathering process to simulate extended field exposure for 1000 hours or more, and then subjected to the mandrel bend test set forth in ASTM D 6083-05 at −26° C. The coating composition described herein when applied as a film, dried and weathered passes the mandrel bend test set forth in ASTM D 6083-05 at −26° C. The dried and weathered coating compositions can have a tensile strength of from 200 psi or greater as set forth in ASTM D 6083-05. For example, the tensile strength of the dried and weathered coating compositions can be 250 psi or greater, 300 psi or greater, 350 psi or greater, or 400 psi or greater. Such dried and weathered coating compositions can also have an elongation at break of greater than 100% (e.g., greater than 200%, greater than 300%, or greater than 400%) as set forth in ASTM D 6083-05.

The examples below are intended to further illustrate certain aspects of the methods and compositions described herein, and are not intended to limit the scope of the claims.

EXAMPLES

Acrylic Copolymer Blends

An aqueous dispersion of acrylic copolymers was prepared by combining two copolymer dispersions, each separately prepared by emulsion polymerization. Exemplary ingredients used to prepare the coating compositions described herein are shown in Table 1.

TABLE 1

| Ingredients | Ex. 1 (wt %) | Ex. 2 (wt %) | Ex. 3 (wt %) | Ex. 4 (wt %) |
| --- | --- | --- | --- | --- |
| Water | 6.9 | 6.8 | 6.8 | 14.8 |
| Propylene glycol | 2.2 | 2.2 | 2.2 | 2.1 |
| Pigment dispersing agent | 0.5 | 0.5 | 0.5 | 0.4 |
| Copolymer Dispersion 1 (Tg = −8° C.) | 28.5 | 28.5 | 28.5 | 0.0 |
| Defoamer | 0.5 | 0.5 | 0.5 | 0.5 |
| Non-ionic surfactant | 0.0 | 0.0 | 0.0 | 0.1 |
| Cellulosic thickener | 0.0 | 0.0 | 0.0 | 0.1 |
| Titanium oxide | 11.2 | 11.2 | 7.8 | 10.2 |
| Zinc oxide | 0.0 | 0.0 | 3.4 | 0.0 |
| Calcium carbonate (medium particle size) | 26.4 | 21.9 | 21.9 | 24.3 |
| Calcium carbonate (fine particle size) | 1.3 | 5.9 | 5.9 | 1.3 |
| Calcium carbonate (ultrafine particle size) | 0.0 | 7.9 | 7.9 | 0.0 |
| Uncoated talc | 18.3 | 0.0 | 0.0 | 7.5 |
| Biocide | 0.2 | 0.2 | 0.2 | 0.2 |
| Copolymer Dispersion 2 (Tg = −28° C.) | 12.8 | 12.8 | 12.8 | 37.8 |
| Cellulose thickener | 0.3 | 0.3 | 0.3 | 0.3 |
| Ammonia | 0.2 | 0.2 | 0.2 | 0.2 |
| Defoamer | 0.9 | 0.9 | 0.9 | 0.9 |
| Total | 110.2 | 99.8 | 99.8 | 100.7 |
| Approximate Weight % Solids | 72 | 72 | 72 | 66 |

The ingredients were mixed in the order shown in Table 1 until a homogeneous mixture was formed. The viscosities of the resulting mixtures were in the range of 12,000 to 85,000 cps at 25° C. The percentages of PVC in the mixtures were approximately 42%. The volume percentages of solids in the mixtures were approximately 59%.

Performance Properties of Comparative Example 1 and Example 5

Example 5 was prepared using 20 weight percent of D1 and 80 weight percent of D2. D1 is an acrylic copolymer containing diacetone acrylamide and adipic dihydrazide (DAAM/ADDH) room temperature crosslinking package and having a Tg of −28° C. D2 is a styrene-acrylate copolymer containing a silane crosslinker and having a Tg of −8° C. The dispersion was combined with additives listed in Table 1 to form a coating composition. The coating composition was applied as a film, dried, and weathered for 1278 hours. The resulting weathered film had a tensile strength of 390 psi, a 443% elongation at break, and a water absorption of 13.4%. The weathered film also passed the −26° C. mandrel bend test set forth in ASTM D 6083-05. A film prepared from D2 as the only copolymer (Comparative Example 1) and including the same additives in the same amounts as Example 5 failed the mandrel bend test after weathering and under similar conditions.

Example 6 was the same as Example 5 except it used 35 weight percent of D1 and 65 weight percent of D2 as described above. The resulting weathered film had a tensile strength of 354 psi, a 387% elongation at break, and a water absorption of 13.2%. The film of Example 6 also passed the −26° C. mandrel bend test set forth in ASTM D 6083-05.

Example 7 was the same as Example 5 except it used 50 weight percent of D1 and 50 weight percent of D2 as described above. The resulting weathered film had a tensile strength of 344 psi, a 388% elongation at break, and a water absorption of 13.6%. The film of Example 7 also passed the −26° C. mandrel bend test set forth in ASTM D 6083-05.

The compositions, products, and methods of the appended claims are not limited in scope by the specific compositions, products, and methods described herein, which are intended as illustrations of a few aspects of the claims and any compositions, products, and methods that are functionally equivalent are intended to fall within the scope of the claims. Various modifications of the compositions, products, and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited.

Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. A coating composition, comprising a first copolymer and a second copolymer, wherein:
    the first copolymer is produced by emulsion polymerization and derived from one or more (meth)acrylates, one or more acid monomers, and optionally styrene, said first copolymer having a $T_g$ from −50° C. to −23° C. and being present in an amount of 10-50% by weight based on the combined weight of the first copolymer and the second copolymer;
    the second copolymer is produced by emulsion polymerization and derived from one or more (meth)acrylates, one or more acid monomers, and optionally styrene, said second copolymer having a $T_g$ from −15° C. to 25° C. and being present in an amount of 50-90% by weight based on the combined weight of the first copolymer and the second copolymer;
    a defoamer; and
    a filler comprising at least one pigment, wherein the filler is present in an amount of from 5-50% by weight, based on the coating composition;
    wherein at least one of the first copolymer and the second copolymer is crosslinked,
    wherein said coating composition has a viscosity of from 12,000 to 85,000 cps at 25° C., a volume solids of greater than 50%, and a weight solids of greater than 60%,
    wherein the coating composition when applied as a film, dried and weathered for 1000 hours passes the mandrel bend test at −26° C., has a tensile strength of greater than 300 psi, and an elongation at break of greater than 200% as set forth in ASTM D 6083-05.

2. The coating composition of claim 1, wherein the coating composition when applied as a film, dried and weathered for 1000 hours as described in ASTM D 6083-05 has a tensile strength of greater than 300 psi to 400 psi.

3. The coating composition of claim 1, wherein the at least one first copolymer is present in an amount of 20-30% by weight based on the combined weight of the first copolymer and the second copolymer.

4. The coating composition of claim 1, wherein the first copolymer has a $T_g$ of from −36° C. to −23° C.

5. The coating composition of claim 1, wherein the second copolymer has a $T_g$ of from −12° C. to 0° C.

6. The coating composition of claim 1, wherein at least one of the first copolymer and the second copolymer is a styrene acrylic copolymer.

7. The coating composition of claim 1, wherein the first copolymer and the second copolymer are pure acrylics.

8. The coating composition of claim 1, wherein the first copolymer and the second copolymer are each derived from at least one low $T_g$ monomer selected from the group consisting of butyl acrylate and 2-ethylhexyl acrylate.

9. The coating composition of claim 1, wherein at least one of the first copolymer and the second copolymer are further derived from at least one high $T_g$ monomer selected from the group consisting of methyl methacrylate and styrene.

10. The coating composition of claim 1, wherein at least one of the first copolymer and the second copolymer is derived from a crosslinkable monomer selected from diacetone acrylamide, a 1,3-diketo-containing monomer, or a silane-containing monomer.

11. The coating composition of claim 1, wherein the acid monomers in the first copolymer and the second copolymer are each selected from the group consisting of acrylic acid, methacrylic acid, itaconic acid, maleic acid, fumaric acid, and mixtures thereof.

12. The coating composition of claim 1, wherein at least one of the first copolymer and the second copolymer is further derived from (meth)acrylamide.

13. The coating composition of claim 1, further comprising a quick setting additive.

14. The coating composition of claim 13, wherein the quick setting additive includes polyethyleneimine.

15. The coating composition of claim 1, further comprising a setting accelerator.

16. The coating composition of claim 1, wherein the filler is present in an amount of from 10-40% by weight, based on the coating composition.

17. The coating composition of claim 1, wherein the filler comprises a pigment selected from metal oxides, clays, calcium carbonate, talc, barytes, feldspar, zinc sulfite, nepheline syenite, mica, pyrophyllite, perlite, wollastonite, or a combination thereof.

18. The coating composition of claim 17, wherein the pigment has a mean particle size of from about 0.01 to about 50 microns.

19. A composition, comprising:
    a first copolymer produced by emulsion polymerization and derived from one of more of butyl acrylate and 2-ethylhexyl acrylate, one or more acid monomers, a crosslinkable monomer, and optionally styrene or methyl methacrylate, said first copolymer having a $T_g$ from −36° C. to −23° C.;
    a second copolymer produced by emulsion polymerization and derived from one of more of butyl acrylate and 2-ethylhexyl acrylate, one or more acid monomers, a crosslinkable monomer, and optionally styrene or methyl methacrylate, said second copolymer having a $T_g$ from −12° C. to 0° C., and
    a filler comprising at least one pigment, wherein the filler is present in an amount of from 5-50% by weight, based on the composition;
    wherein the composition has a viscosity of from 12,000 to 85,000 cps at 25° C., and
    wherein the composition when applied as a film, dried and weathered for 1000 hours passes the mandrel bend test at −26° C., has a tensile strength of greater than 300 psi, and an elongation at break of greater than 200% as set forth in ASTM D 6083-05.

20. The composition of claim 19, wherein the first copolymer and the second copolymer are dispersed in an aqueous medium.

21. The composition of claim 20, wherein the filler is present in an amount of from 10-40% by weight, based on the composition.

22. The composition of claim 19, wherein the filler comprises a pigment selected from metal oxides, clays, calcium carbonate, talc, barytes, feldspar, zinc sulfite, nepheline syenite, mica, pyrophyllite, perlite, wollastonite, or a combination thereof.

23. The composition of claim 22, wherein the pigment has a mean particle size of from about 0.01 to about 50 microns.

24. A dried coating, formed by drying the composition of claim 20.

25. A method of coating a substrate, comprising applying the composition of claim 20 to a surface.

26. The method of claim 25, wherein the surface is a roof surface.

27. The method of claim 25, wherein the surface is a wall.

28. The method of claim 25, wherein the method includes brushing, rolling, or spraying.

* * * * *